United States Patent
Owada et al.

(10) Patent No.: US 9,896,569 B2
(45) Date of Patent: Feb. 20, 2018

(54) POLYCARBONATE RESIN COMPOSITION AND MOLDED ARTICLE

(71) Applicants: IDEMITSU KOSAN CO., LTD., Chiyoda-ku (JP); ASAHI FIBER GLASS CO., LTD., Chiyoda-ku (JP)

(72) Inventors: Takanori Owada, Ichikawa (JP); Keiji Sekine, Koza-gun (JP); Takenori Noguchi, Kamakura (JP)

(73) Assignees: IDEMITSU KOSAN CO., LTD., Chiyoda-ku (JP); Asahi Fiber Glass CO., LTD., Chiyoda-ku (JP)

( * ) Notice: Subject to any disclaimer, the term of this patent is extended or adjusted under 35 U.S.C. 154(b) by 0 days.

(21) Appl. No.: 14/440,152

(22) PCT Filed: Nov. 5, 2013

(86) PCT No.: PCT/JP2013/079899
§ 371 (c)(1),
(2) Date: May 1, 2015

(87) PCT Pub. No.: WO2014/069659
PCT Pub. Date: May 8, 2014

(65) Prior Publication Data
US 2015/0291767 A1 Oct. 15, 2015

(30) Foreign Application Priority Data
Nov. 5, 2012 (JP) ................................. 2012-243612

(51) Int. Cl.
C08K 3/40 (2006.01)
C08L 69/00 (2006.01)
C08K 7/14 (2006.01)
C03C 13/00 (2006.01)
C03C 3/087 (2006.01)
C03C 3/091 (2006.01)
C03C 3/118 (2006.01)
C03C 12/00 (2006.01)

(52) U.S. Cl.
CPC ............... C08K 3/40 (2013.01); C03C 3/087 (2013.01); C03C 3/091 (2013.01); C03C 3/118 (2013.01); C03C 12/00 (2013.01); C03C 13/00 (2013.01); C08K 7/14 (2013.01)

(58) Field of Classification Search
CPC ... C08K 3/40; C08G 64/1608; C08G 64/1625
USPC .......................................... 524/494; 528/219
See application file for complete search history.

(56) References Cited

U.S. PATENT DOCUMENTS

| 6,211,526 B1* | 4/2001 | Huston | B41M 3/144 250/330 |
| 6,316,576 B1* | 11/2001 | Fujimori | C08G 64/0208 528/196 |
| 7,138,479 B2* | 11/2006 | Dhara | C08G 64/1616 252/299.61 |
| 2006/0020075 A1* | 1/2006 | Basham | C08J 5/18 524/494 |
| 2007/0179237 A1* | 8/2007 | Sekine | C03C 13/00 524/492 |
| 2008/0146759 A1* | 6/2008 | Takashima | C08G 18/38 526/289 |
| 2009/0105444 A1* | 4/2009 | Chatterjee | C08G 63/64 528/196 |
| 2011/0034646 A1* | 2/2011 | Fuji | C08G 64/30 526/65 |
| 2013/0052465 A1* | 2/2013 | Shen | B29C 45/1671 428/412 |

FOREIGN PATENT DOCUMENTS

| CN | 101514060 A | | 8/2009 |
| JP | 6 212070 | | 8/1994 |
| JP | 7 118514 | | 5/1995 |
| JP | 8 143760 | | 6/1996 |
| JP | 9 165506 | | 6/1997 |
| JP | 10 147700 | | 6/1998 |
| JP | 2006-22235 | * | 1/2006 |
| JP | 2006 22235 | | 1/2006 |
| JP | 2011 21172 | | 2/2011 |
| JP | 4666459 | | 4/2011 |
| TW | 200530292 A | | 9/2005 |
| WO | WO 2008/156091 | * | 12/2008 |
| WO | WO 2012/096410 | * | 7/2012 |

OTHER PUBLICATIONS

International Search Report dated Feb. 4, 2014 in PCT/JP13/079899 Filed Nov. 5, 2013.
Combined Chinese Office Action and Search Report dated Mar. 2, 2016 in Patent Application No. 201380057463.5 (with English translation of categories of cited documents).

* cited by examiner

*Primary Examiner* — Tae H Yoon
(74) *Attorney, Agent, or Firm* — Oblon, McClelland, Maier & Neustadt, L.L.P.

(57) ABSTRACT

Provided are a polycarbonate resin composition containing a polycarbonate resin containing an aliphatic carbonate repeating unit (A) derived from an aliphatic dihydroxy compound and a specific glass filler, and a molded article.

14 Claims, No Drawings

POLYCARBONATE RESIN COMPOSITION AND MOLDED ARTICLE

TECHNICAL FIELD

The present invention relates to a polycarbonate resin composition and a molded article thereof, and more specifically, to a polycarbonate resin composition that provides a molded body excellent in transparency and a molded article thereof.

BACKGROUND ART

A polycarbonate resin molded article is transparent, and is excellent in heat resistance and mechanical strength such as impact resistance, and hence the molded article has been widely used as an industrial transparent material in the fields of, for example, electricity, machinery, and automobiles. In addition, the molded article has been used as a plastic for an optical material in, for example, a lens or an optical disc.

The polycarbonate resin molded article is excellent in mechanical strength, but its strength is lower than that of a glass or a ceramic. Accordingly, when mechanical strength is needed, the mechanical strength of the molded article is improved by adding, for example, a glass filler.

However, a polycarbonate resin molded article reinforced with a general glass filler in the related art has involved a problem in that its transparency reduces.

To overcome the problem, a study has been made on the maintenance of the transparency of a polycarbonate resin molded article through the following (see, for example, Patent Documents 1 to 5). The refractive indices of a polycarbonate resin and a glass filler are set to substantially the same refractive index by changing the composition of the polycarbonate resin, adding an additive to a polycarbonate resin composition, or changing the composition of the glass filler.

Patent Document 1 discloses a resin composition containing: an aromatic polycarbonate resin using as a chain-end terminator a product of a reaction between a hydroxyaralkyl alcohol and a lactone; and a glass-based filler whose refractive index differs from that of the aromatic polycarbonate resin by 0.01 or less.

Patent Document 2 discloses a resin composition containing: an aromatic polycarbonate resin; glass fibers whose refractive indices each differ from that of the aromatic polycarbonate resin by 0.015 or less; and polycaprolactone.

Patent Document 3 discloses a resin composition containing: an aromatic polycarbonate resin; glass fibers whose refractive indices each differ from that of the aromatic polycarbonate resin by 0.015 or less; and a polyester resin.

Patent Document 4 discloses a resin composition containing: an aromatic polycarbonate resin; glass fibers whose refractive indices each differ from that of the aromatic polycarbonate resin by 0.015 or less; and an aliphatic polycarbonate resin.

Patent Document 5 discloses a polycarbonate resin composition characterized in that; a difference in refractive index between a glass filler and an aromatic polycarbonate resin is from 0.004 to 0.015 for light having a wavelength of 486 nm, is 0.002 or less for light having a wavelength of 589 nm, and is 0.002 or less for light having a wavelength of 656 nm; the content of the glass filler is from 2 to 40 mass %; and when the composition is molded into a flat plate shape, the flat plate has a total light transmittance of 75% or more and a haze of 35% or less.

CITATION LIST

Patent Documents

[Patent Document 1] JP 7-118514 A
[Patent Document 2] JP 9-165506 A
[Patent Document 3] JP 6-212070 A
[Patent Document 4] JP 8-143760 A
[Patent Document 5] JP 4666459B2

SUMMARY OF INVENTION

Technical Problem

In each of Patent Documents 1 to 4, only a refractive index nD (refractive index at 589 nm) has been described and a refractive index has not been adjusted for each wavelength. Accordingly, a molded article formed of each of the resin compositions of the Documents has insufficient transparency and involves, for example, a problem in that the molded article develops rainbow colors.

Patent Document 5 proposes a resin composition whose refractive index has been adjusted for each wavelength as well. However, its transparency is not satisfactory enough to use the resin composition in an application where high transparency is needed, e.g., as an alternative material to a window glass. In addition, when the refractive index of the glass filler is adjusted to that of the aromatic polycarbonate resin having a high refractive index for each wavelength, the Abbe number of the resin composition is liable to reduce and hence a problem in that its chromatic aberration enlarges occurs.

An object of the present invention is to provide a polycarbonate resin composition that provides a molded article extremely excellent in transparency and a molded article excellent in transparency.

Solution to Problem

The inventors of the present invention have made extensive studies to achieve the object, and as a result, have found that a resin composition containing a specific glass filler and a specific polycarbonate resin, and a molded article thereof are suitable for the object. The present invention has been completed on the basis of such finding.

That is, the present invention provides the following items (1) to (17). (1) A polycarbonate resin composition, including: a polycarbonate resin containing an aliphatic carbonate repeating unit (A) derived from an aliphatic dihydroxy compound; and a glass filler containing 50 to 75 mass % of silicon dioxide ($SiO_2$), 0 to 30 mass % of aluminum oxide ($Al_2O_3$), 0 to 20 mass % of boron oxide ($B_2O_3$), 0 to 11 mass % of magnesium oxide (MgO), 0 to 25 mass % of calcium oxide (CaO), 0 to 10 mass % of zinc oxide (ZnO), 0 to 10 mass % of strontium oxide (SrO), 0 to 10 mass % of barium oxide (BaO), 0 to 15 mass % of sodium oxide ($Na_2O$), 0 to 10 mass % of potassium oxide ($K_2O$), 0 to 10 mass % of lithium oxide ($Li_2O$), 0 to 10 mass % of titanium oxide ($TiO_2$), 0 to 1 mass % of iron oxide ($Fe_2O_3$), and 0 to 2 mass % of fluorine ($F_2$), wherein the glass filler contains the silicon dioxide ($SiO_2$) and the aluminum oxide ($Al_2O_3$) at a total content of from 50 to 93 mass %, wherein the glass filler contains the calcium oxide (CaO), the zinc oxide (ZnO), the strontium oxide (SrO), and the barium oxide (BaO) at a total content of from 0 to 25 mass %, and wherein the glass filler contains the sodium oxide ($Na_2O$), the potassium oxide (K$_2$O), and the lithium oxide (Li$_2$O) at a total content of from 0 to 15 mass %.

(2) The polycarbonate resin composition according to the item (1), in which the polycarbonate resin contains the aliphatic carbonate repeating unit (A) derived from the aliphatic dihydroxy compound and an aromatic carbonate repeating unit (B) derived from an aromatic dihydroxy compound.

(3) The polycarbonate resin composition according to the item (1) or (2), in which the aliphatic carbonate repeating unit (A) is represented by the following formula (I):

[Chem. 1]

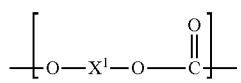
(I)

In the formula, X$^1$ represents a divalent aliphatic hydrocarbon group having 2 to 20 carbon atoms or a divalent alicyclic hydrocarbon group having 4 to 22 carbon atoms, and the divalent aliphatic hydrocarbon group and the divalent alicyclic hydrocarbon group may each contain at least one heteroatom selected from an oxygen atom, a nitrogen atom, and a sulfur atom, and at least one halogen atom selected from a fluorine atom, a chlorine atom, a bromine atom, and an iodine atom.

(4) The polycarbonate resin composition according to the item (2) or (3), in which the aromatic carbonate repeating unit (B) is represented by the following formula (II):

[Chem. 2]

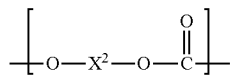
(II)

In the formula, X$^2$ represents a hydrocarbon residue containing an aromatic group.

(5) The polycarbonate resin composition according to any one of the items (2) to (4), in which the polycarbonate resin has a molar ratio (A/B) of the aliphatic carbonate repeating unit (A) to the aromatic carbonate repeating unit (B) in a range of from 100/0 to 0.5/99.5.

(6) The polycarbonate resin composition according to any one of the items (1) to (5), in which: the polycarbonate resin has an Abbe number of 35 or more; and a difference (nF-nC) between a refractive index (nF) of the polycarbonate resin for light having a wavelength of 486.1 nm and a refractive index (nC) thereof for light having a wavelength of 656.3 nm is 0.015 or less.

(7) The polycarbonate resin composition according to any one of the items (1) to (6), in which the polycarbonate resin has a glass transition temperature of from 75 to 175° C.

(8) The polycarbonate resin composition according to any one of the items (1) to (7), in which the glass filler contains the sodium oxide (Na$_2$O), the potassium oxide (K$_2$O), and the lithium oxide (Li$_2$O) at a total content of from 0 to 10 mass %.

(9) The polycarbonate resin composition according to any one of the items (1) to (8), in which the glass filler has a refractive index at a wavelength of 589.3 nm of from 1.500 to 1.540.

(10) The polycarbonate resin composition according to any one of (1) to (9), in which the glass filler has an Abbe number of 35 or more.

(11) The polycarbonate resin composition according to any one of the items (1) to (10), in which a difference between a refractive index of the polycarbonate resin and a refractive index of the glass filler is 0.004 or less for light having a wavelength of 486.1 nm, is 0.002 or less for light having a wavelength of 589.3 nm, and is 0.002 or less for light having a wavelength of 656.3 nm.

(12) The polycarbonate resin composition according to any one of the items (1) to (11), in which the polycarbonate resin composition includes 98 to 60 mass % of the polycarbonate resin and 2 to 40 mass % of the glass filler with respect to a total amount of the polycarbonate resin and the glass filler.

(13) The polycarbonate resin composition according to any one of the items (1) to (12), in which when the polycarbonate resin composition is molded into a flat plate shape, the flat plate has a total light transmittance of 75% or more and a haze value of 35% or less.

(14) A molded article, which is obtained by molding the polycarbonate resin composition of any one of the items (1) to (13).

Advantageous Effects of Invention

According to embodiments of the present invention, it is possible to provide the polycarbonate resin composition that provides a molded article excellent in transparency and the molded article excellent in transparency, and the resin composition and the molded article can be suitably used as alternative materials to glasses including the windows of automobiles, buildings, and the like.

DESCRIPTION OF EMBODIMENTS

<Glass Filler>

A glass filler in a polycarbonate resin composition of the present invention has the following composition: the glass filler contains 50 to 75 mass % of silicon dioxide (SiO$_2$), 0 to 30 mass % of aluminum oxide (Al$_2$O$_3$), 0 to 20 mass % of boron oxide (B$_2$O$_3$), 0 to 11 mass % of magnesium oxide (MgO), 0 to 25 mass % of calcium oxide (CaO), 0 to 10 mass % of zinc oxide (ZnO), 0 to 10 mass % of strontium oxide (SrO), 0 to 10 mass % of barium oxide (BaO), 0 to 15 mass % of sodium oxide (Na$_2$O), 0 to 10 mass % of potassium oxide (K$_2$O), 0 to 10 mass % of lithium oxide (Li$_2$O), 0 to 10 mass % of titanium oxide (TiO$_2$), 0 to 1 mass % of iron oxide (Fe$_2$O$_3$), and 0 to 2 mass % of fluorine (F$_2$), wherein the glass filler contains the silicon dioxide (SiO$_2$) and the aluminum oxide (Al$_2$O$_3$) at a total content of from 50 to 93 mass %, wherein the glass filler contains the calcium oxide (CaO), the zinc oxide (ZnO), the strontium oxide (SrO), and the barium oxide (BaO) at a total content of from 0 to 25 mass %, and wherein the glass filler contains the sodium oxide (Na$_2$O), the potassium oxide (K$_2$O), and the lithium oxide (Li$_2$O) at a total content of from 0 to 15 mass %.

The glass filler of the present invention is used for reinforcing a polycarbonate resin containing an aliphatic carbonate repeating unit (A) to be described later.

In the composition of the glass filler, the content of the silicon dioxide (SiO$_2$) is from 50 to 75 mass %. When the content of the silicon dioxide (SiO$_2$) is less than 50 mass %, it may become difficult to adjust the refractive index of the glass filler to a desired one. In addition, when the content exceeds 75 mass %, solubility in the production of a glass may reduce. From these viewpoints, the content of the silicon dioxide ($SiO_2$) is preferably from 55 to 75 mass %, more preferably from 60 to 75 mass %.

The content of the aluminum oxide ($Al_2O_3$) is from 0 to 30 mass %. When the content of the aluminum oxide ($Al_2O_3$) exceeds 30 mass %, the solubility reduces and hence the glass filler to be obtained is liable to be nonuniform. From this viewpoint, the content of the aluminum oxide ($Al_2O_3$) is preferably from 1 to 25 mass %.

The total content of the silicon dioxide ($SiO_2$) and the aluminum oxide ($Al_2O_3$) is from 50 to 93 mass %. When the total content of the silicon dioxide ($SiO_2$) and the aluminum oxide ($Al_2O_3$) is less than 50 mass %, it may become difficult to adjust the refractive index to a desired one. In addition, when the total content exceeds 93 mass %, the solubility in the production of the glass may reduce. From these viewpoints, the total content of the silicon dioxide ($SiO_2$) and the aluminum oxide ($Al_2O_3$) is preferably from 65 to 80 mass %.

The boron oxide ($B_2O_3$) is an optional component and the glass filler contains the component at a content of from 0 to 20 mass %. The incorporation of the boron oxide ($B_2O_3$) can improve the solubility of the glass and can improve, for example, the water resistance of the glass. When the content of the boron oxide ($B_2O_3$) exceeds 20 mass %, the strength of the glass filler may reduce. From this viewpoint, the content of the boron oxide ($B_2O_3$) is preferably from 0 to 8 mass %, more preferably from 0 to 5 mass %.

The magnesium oxide (MgO) is an optional component and the glass filler contains the component at a content of from 0 to 11 mass %. The incorporation of the magnesium oxide (MgO) can improve the physical properties such as tensile strength of the glass filler and can improve its chemical durability. When the content of the magnesium oxide (MgO) exceeds 11 mass %, the solubility of the glass may reduce. From this viewpoint, the content of the magnesium oxide (MgO) is preferably from 0 to 10 mass %.

The calcium oxide (CaO) is an optional component and the glass filler contains the component at a content of from 0 to 25 mass %. When the content of the calcium oxide (CaO) exceeds 25 mass %, it may become difficult to adjust the refractive index to a desired one and the glass may be liable to crystallize. From these viewpoints, the content of the calcium oxide (CaO) is preferably from 0 to 15 mass %.

The zinc oxide (ZnO), the strontium oxide (SrO), and the barium oxide (BaO) are optional components, and the glass filler contains each of the components at a content of from 0 to 10 mass %.

The incorporation of the zinc oxide (ZnO), the strontium oxide (SrO), and the barium oxide (BaO) through substitution for the calcium oxide (CaO) can improve the solubility of the glass and can suppress the crystallization of the glass. However, when the content of each of the components exceeds 10 mass %, the liquidus temperature of the glass increases and hence the glass may be liable to crystallize. From this viewpoint, the content of each of the zinc oxide (ZnO), the barium oxide (BaO), and the strontium oxide (SrO) is preferably from 0 to 5 mass %.

The total content of the calcium oxide (CaO), the zinc oxide (ZnO), the strontium oxide (SrO), and the barium oxide (BaO) is from 0 to 25 mass %. When the total content exceeds 25 mass %, it may become difficult to adjust the refractive index to a desired one. The total content of the calcium oxide (CaO), the zinc oxide (ZnO), the strontium oxide (SrO), and the barium oxide (BaO) is preferably from 5 to 25 mass %. When the total content is 5 mass % or more, the solubility of the glass improves.

The sodium oxide ($Na_2O$) is an optional component and the glass filler contains the component at a content of from 0 to 15 mass %. When the content of the sodium oxide exceeds 15 mass %, the water resistance of the glass reduces and an alkali is liable to be eluted. The eluted alkali component hydrolyzes the polycarbonate resin to reduce its molecular weight, which is responsible for reductions in physical properties of a molded article of the resin composition. From this viewpoint, the content of the sodium oxide ($Na_2O$) is preferably from 0 to 5 mass %.

The potassium oxide ($K_2O$) and the lithium oxide ($Li_2O$) are optional components, and the glass filler contains each of the components at a content of from 0 to 10 mass %. The incorporation of the potassium oxide ($K_2O$) and the lithium oxide ($Li_2O$) through substitution for the sodium oxide ($Na_2O$) can improve the solubility of the glass. However, when the content of each of the components exceeds 10 mass %, the water resistance of the glass reduces and an alkali is liable to be eluted. The eluted alkali component hydrolyzes the polycarbonate resin to reduce its molecular weight, which is responsible for the reductions in physical properties of the molded article. In addition, the glass is liable to crystallize. From these viewpoints, the content of each of the potassium oxide ($K_2O$) and the lithium oxide ($Li_2O$) is preferably from 0 to 5 mass %.

The total content of the sodium oxide ($Na_2O$), the potassium oxide ($K_2O$), and the lithium oxide ($Li_2O$) is from 0 to 15 mass %. When the total content of the sodium oxide ($Na_2O$), the potassium oxide ($K_2O$), and the lithium oxide ($Li_2O$) exceeds 15 mass %, the water resistance of the glass reduces and an alkali is liable to be eluted. The eluted alkali component hydrolyzes the polycarbonate resin to reduce its molecular weight, which is responsible for the reductions in physical properties of the molded article. From this viewpoint, the total content of the sodium oxide ($Na_2O$), the potassium oxide ($K_2O$), and the lithium oxide ($Li_2O$) is preferably from 0 to 10 mass %.

The titanium oxide ($TiO_2$) is an optional component and the glass filler contains the component at a content of from 0 to 10 mass %. The incorporation of the titanium oxide ($TiO_2$) can improve the solubility of the glass and can improve the water resistance of the glass. When the content of the titanium oxide ($TiO_2$) exceeds 10 mass %, the glass is liable to crystallize and the polycarbonate resin is hydrolyzed to undergo a reduction in molecular weight, which is responsible for the reductions in physical properties of the molded article. From this viewpoint, the content of the titanium oxide ($TiO_2$) is preferably from 0 to 5 mass %, more preferably from 0 to 4 mass %, still more preferably from 0 to 2 mass %. When the content of the titanium oxide ($TiO_2$) is 2 mass % or less, the coloring of the glass in the presence of the iron oxide ($Fe_2O_3$) incorporated as an impurity can be suppressed.

In addition, in order that the coloring of the glass filler may be suppressed, the content of the iron oxide ($Fe_2O_3$) as an impurity in the raw materials is from 0 to 1 mass %, and is preferably from 0 to 0.1 mass % with respect to the entirety of the glass.

In addition, in order that the coloring of the glass filler may be suppressed, diantimony trioxide ($Sb_2O_3$) is preferably incorporated at a content of from 0 to 2 mass % with respect to the entirety of the glass. Further, in order that the solubility of the glass filler may be improved, the fluorine ($F_2$) may be incorporated at a content of from 0 to 2 mass %, preferably from 0 to 1 mass % with respect to the entirety of the glass.

In addition, the glass filler that can be used in the polycarbonate resin composition of the present invention may further contain any one of the following components as long as the adjustment of the refractive index of the glass filler formed of the foregoing composition, the physical properties of the glass, the moldability of the glass, and the like are not adversely affected.

For example, an oxide containing the following element may be incorporated as a component for adjusting the refractive index of the grass filler: zirconium (Zr), lanthanum (La), yttrium (Y), gadolinium (Gd), bismuth (Bi), antimony (Sb), tantalum (Ta), niobium (Nb), tungsten (W), or the like. In addition, an oxide containing the following element may be incorporated as a component for adjusting or removing the color of the glass: cobalt (Co), copper (Cu), neodymium (Nd), antimony (Sb), or the like. Zirconium oxide ($ZrO_3$) is an optional component and the glass filler preferably contains the component at a content of from 0 to 10 mass %. When the content of the zirconium oxide ($ZrO_3$) exceeds 10 mass %, the solubility in the production of the glass may reduce.

The specific gravity of the glass filler is preferably set to 2.75 or less from the viewpoint of a weight reduction.

In the present invention, the glass filler can be used in various forms such as glass fibers, glass powder, a glass flake, milled fibers, and glass beads. The glass filler is preferably used as the glass fibers in terms of a reinforcing effect.

The glass fibers can be obtained by employing a conventionally known spinning method for glass long fibers. For example, glass can be turned into fibers by employing any one of the various methods such as: a direct melt (DM) method involving continuously turning glass raw materials into glass in a melting furnace, introducing the resultant glass into a forehearth, and attaching a bushing to the bottom of the forehearth to spin the glass; and a remelting method involving processing molten glass into a marble-, cullet-, or rod-like shape, remelting the resultant, and spinning the resultant. Although the average fiber diameter of the glass fibers is not particularly limited, fibers having an average fiber diameter of from 3 to 25 μm are preferably used. When the average fiber diameter is less than 3 μm, the area of contact between the glass fibers and the resin increases to be responsible for irregular reflection, and hence the transparency of the molded article reduces in some cases. When the average fiber diameter is more than 25 μm, the strength of each of the glass fibers reduces, and as a result, the strength of the molded article reduces in some cases. Preferably used in the molded article are such glass fibers that a ratio (aspect ratio) between their average fiber length and average fiber diameter is from 2 to 150. When the aspect ratio is 2 or more, an improving effect on the mechanical strength of the molded article is obtained. When the aspect ratio is 150 or less, the molded article obtains high transparency and hence the external appearance of the molded article improves. From the foregoing viewpoints, the average fiber diameter of the glass fibers in the molded article is preferably from 3 to 25 μm, more preferably from 5 to 15 μm, still more preferably from 7 to 15 μm. In addition, the aspect ratio of the glass fibers in the molded article is more preferably from 2.5 to 120, still more preferably from 3 to 100.

The glass powder is obtained by a conventionally known production method. Powder having a desired particle diameter can be obtained by, for example, melting the glass raw materials in a melting furnace and charging the melt into water, followed by water granulation, or molding the melt into a sheet shape with a cooling roll, followed by the pulverization of the sheet. The particle diameter of the glass powder is not particularly limited, but glass powder having a particle diameter of from 1 to 100 μm is preferably used.

The glass flake is obtained by a conventionally known production method. A flake having a desired aspect ratio can be obtained by, for example, melting the glass raw materials in a melting furnace, drawing the melt in a tubular shape to make the thickness of the glass constant, then pulverizing the glass with a roll to provide a frit having a specific thickness, and pulverizing the frit. The thickness and aspect ratio of the glass flake are not particularly limited, but a glass flake having a thickness of from 0.1 to 10 μm and an aspect ratio of from 5 to 150 is preferably used.

The milled fibers can be obtained by employing a conventionally known milled fiber production method. The milled fibers can be obtained by, for example, pulverizing a strand of glass fibers with a hammer mill or a ball mill. The average fiber diameter and aspect ratio of the milled fibers are not particularly limited, but milled fibers having an average fiber diameter of from 3 to 25 μm and an aspect ratio of from 2 to 150 are preferably used. The average fiber diameter of the milled fibers is more preferably from 5 to 20 μm, still more preferably from 7 to 15 μm. In addition, the aspect ratio of the milled fibers is more preferably from 2.5 to 90, still more preferably from 3 to 70.

The glass beads are obtained by a conventionally known production method. Glass beads having desired particle diameters can be obtained by, for example, melting the glass raw materials in a melting furnace and spraying the melt with a burner. The particle diameters of the glass beads are not particularly limited, but glass beads each having a particle diameter of from 5 to 300 μm are preferably used.

In addition, in order that a reduction in transparency of the molded article due to void formation may be suppressed by improving an affinity between the polycarbonate resin and the glass filler to improve adhesiveness therebetween, the glass filler is preferably subjected to a surface treatment with a treatment agent containing a coupling agent.

A silane-based coupling agent, a borane-based coupling agent, an aluminate-based coupling agent, a titanate-based coupling agent, or the like can be used as the coupling agent. The silane-based coupling agent is particularly preferably used because adhesiveness between the polycarbonate-based resin and the glass filler can be improved. For example, an aminosilane-based coupling agent, an epoxysilane-based coupling agent, or an acrylic silane-based coupling agent may be used as the silane-based coupling agent. Among those silane-based coupling agents, an aminosilane-based coupling agent is most preferably used.

In addition, for example, a film former, a lubricant, and an antistatic agent are given as a component to be incorporated into the treatment agent other than the coupling agent. One kind of these components may be used alone, or a plurality of these components may be used in combination. The following may be used as the film former: a polymer such as a vinyl acetate resin, a urethane resin, an acrylic resin, a polyester resin, a polyether resin, a phenoxy resin, a polyamide resin, an epoxy resin, or a polyolefin resin, or a modified product thereof.

An aliphatic ester-based, aliphatic ether-based, aromatic ester-based, or aromatic ether-based surfactant may be used as the lubricant. The following may be used as the antistatic agent: an inorganic salt such as lithium chloride or potassium iodide, or a quaternary ammonium salt such as an ammonium chloride-type or quaternary ammonium ethosulfate-type ammonium salt.

The refractive index of the glass filler at a wavelength of 589.3 nm is preferably set to from 1.500 to 1.540, and the Abbe number of the glass filler is preferably set to 35 or more. Thus, the transparency of, in particular, each of a resin composition obtained by combining the glass filler with the polycarbonate resin containing the aliphatic carbonate repeating unit (A) to be described later, and a molded article thereof can be improved.

[Polycarbonate Resin]

The polycarbonate resin in the polycarbonate resin composition of the present invention contains the aliphatic carbonate repeating unit (A) derived from an aliphatic dihydroxy compound. The polycarbonate resin in the polycarbonate resin composition of the present invention preferably contains the aliphatic carbonate repeating unit (A) derived from the aliphatic dihydroxy compound and an aromatic carbonate repeating unit (B) derived from an aromatic dihydroxy compound.

(Aliphatic Carbonate Repeating Unit (A))

The aliphatic carbonate repeating unit (A) is represented by the following formula (I).

[Chem. 3]

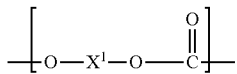
(I)

In the general formula (I), $X^1$ represents a divalent aliphatic hydrocarbon group having 2 to 20 carbon atoms or a divalent alicyclic hydrocarbon group having 4 to 22 carbon atoms. The divalent aliphatic hydrocarbon group and the divalent alicyclic hydrocarbon group each represented by $X^1$ may each contain at least one heteroatom selected from an oxygen atom, a nitrogen atom, and a sulfur atom, and at least one halogen atom selected from a fluorine atom, a chlorine atom, a bromine atom, and an iodine atom. The alicyclic hydrocarbon group containing a heteroatom is, for example, a divalent oxygen- or nitrogen-containing saturated heterocyclic group having 4 to 20 carbon atoms.

Specific examples of the divalent group represented by $X^1$ include divalent groups each obtained by removing two hydroxyl groups from an aliphatic dihydroxy compound to be described later. Among them, a divalent group obtained by removing two hydroxyl groups from an aliphatic dihydroxy compound represented by the following general formula (1) is preferred.

(Aromatic Carbonate Repeating Unit (B))

The aromatic carbonate repeating unit (B) is represented by the following formula (II).

[Chem. 4]

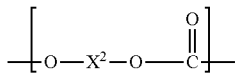
(II)

In the general formula (II), $X^2$ represents a hydrocarbon residue containing an aromatic group.

The hydrocarbon residue containing an aromatic group represented by $X^2$ is preferably a residue having such a structure that an aromatic hydrocarbon group is bonded to an oxygen atom adjacent to $X^2$. The hydrocarbon residue containing an aromatic group represented by $X^2$ may contain: at least one heteroatom selected from an oxygen atom, a nitrogen atom, a sulfur atom, and a silicon atom; at least one halogen atom selected from a fluorine atom, a chlorine atom, a bromine atom, and an iodine atom; and one or more kinds of groups selected from an aliphatic hydrocarbon group having 1 to 20 carbon atoms, an alicyclic hydrocarbon group having 5 to 20 carbon atoms, and an aromatic hydrocarbon group having 6 to 20 carbon atoms.

Specific examples of the hydrocarbon residue containing an aromatic group represented by $X^2$ include groups each obtained by removing two hydroxyl groups from an aromatic dihydroxy compound to be described later.

(Aliphatic Dihydroxy Compound)

The aliphatic carbonate repeating unit (A) is derived from an aliphatic dihydroxy compound.

The aliphatic dihydroxy compound is, for example, a compound represented by the following general formula (1).

[Chem. 5]

(1)

In the general formula (1), $R^1$ represents an alkylene group having 2 to 18, preferably 2 to 10, more preferably 3 to 6 carbon atoms, a cycloalkylene group having 4 to 20, preferably 5 to 20 carbon atoms, or a divalent oxygen- or nitrogen-containing saturated heterocyclic group having 4 to 20, preferably 5 to 20 carbon atoms, and may contain at least one heteroatom selected from an oxygen atom, a nitrogen atom, and a sulfur atom, and at least one halogen atom selected from a fluorine atom, a chlorine atom, a bromine atom, and an iodine atom, and a represents an integer of 0 or 1.

Examples of the alkylene group having 2 to 18 carbon atoms include an ethylene group, a n-propylene group, an isopropylene group, a n-butylene group, an isobutylene group, a n-pentylene group, a n-hexylene group, a n-heptylene group, a n-octylene group, a 2-ethylhexylene group, a n-nonylene group, a n-decylene group, a n-undecylene group, a n-dodecylene group, a n-tridecylene group, a n-tetradecylene group, a n-pentadecylene group, a n-hexadecylene group, a n-heptadecylene group, and a n-octadecylene group. Examples of the cycloalkylene group having 4 to 20 carbon atoms include a cyclopentylene group, a cyclohexylene group, a cyclooctylene group, a cyclodecylene group, a cyclotetradecylene group, an adamantylene group, a bicycloheptylene group, a bicyclodecylene group, and a tricyclodecylene group.

Examples of the aliphatic dihydroxy compound include: dihydroxy compounds each having a chain aliphatic hydrocarbon group such as ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 2,2-dimethylpropane-1,3-diol, diethylene glycol, triethylene glycol, tetraethylene glycol, octaethylene glycol, dipropylene glycol, N-methyldiethanolamine, and p-xylylene glycol; dihydroxy compounds each having an alicyclic hydrocarbon group such as 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 2,6-decalindiol, 1,5-decalindiol, 2,3-decalindiol, 2,6-decalindimethanol, 1,5-decalindimethanol, 2,3-decalindimethanol, 2,3-norbornanediol, 2,5-norbornanediol, 2,3-norbornanedimethanol, 2,5-norbornanedimethanol, 2,2-bis(4-hydroxycyclohexyl)-propane, 1,3-adamantanediol, 1,3-adamantanedimethanol, and tricyclodecanedimethanol; condensed polycyclic ether diols such as isosorbide; heterocyclic spiro compounds such as cyclic ether diols, e.g., 3,9-bis(2-hydroxyethyl)-2,4,8,10-tetraoxaspiro[5.5]undecane, 3,9-bis(2-hydroxy-1,1-dimethylethyl)-2,4,8,10-tetraoxaspiro[5.5] undecane, 3,9-bis(2-hydroxy-1,1-diethylethyl)-2,4,8,10-tetraoxaspiro[5.5] undecane, 3,9-bis(2-hydroxy-1,1-dipropylethyl)-2,4,8,10-tetraoxaspiro[5.5] undecane, and 1,4-anhydroerythritol; cyclic acetal diols such as 2-(5-ethyl-5-hydroxymethyl-1,3-dioxan-2-yl)-2-methylpropan-1-ol; N-heterocyclic diols such as 3,4-pyrrolidinediol, 3,4-dimethylpiperidinediol, N-ethyl-3,4-piperidinediol, and N-ethyl-3,5-piperidinediol; and S-heterocyclic diols such as deoxythiofructose.

Among those aliphatic dihydroxy compounds, 1,4-cyclohexanedimethanol, tricyclodecanedimethanol, 1,3-adamantanedimethanol, 2,2-bis(4-hydroxycyclohexyl)-propane, 3,9-bis(2-hydroxy-1,1-dimethylethyl-2,4,8,10-tetraoxaspiro [5.5] undecane, 2-(5-ethyl-5-hydroxymethyl-1,3-dioxan-2-yl)-2-methylpropan-1-ol, isosorbide, 1,3-propanediol, 1,4-butanediol, and 1,6-hexanediol are preferred from the viewpoints of ease in production, properties, and the variety of applications. Among them, 1,4-cyclohexanedimethanol, tricyclodecanedimethanol, and isosorbide are more preferred from the viewpoint of heat resistance.

One kind of the aliphatic dihydroxy compounds may be used alone, or two or more kinds thereof may be used in combination.

A method of purifying the aliphatic dihydroxy compound to be used in the present invention is not particularly limited. The compound may be preferably purified by any one of simple distillation, rectification, and recrystallization, or a combination of two or more of these approaches. It should be noted that a commercial product of the aliphatic dihydroxy compound contains a stabilizer or a deterioration product produced during its storage in some cases, and such content may adversely affect the quality of the polymer. When the polymer is obtained by using the aliphatic dihydroxy compound, it is preferred that the compound be purified again and used in a polymerization reaction immediately thereafter. When it is inevitable that the compound is stored after purification for a while before its use, the compound is preferably stored under a dry, light-shielded, and inert atmosphere having a temperature as low as 40° C. or less before the use.

(Aromatic Dihydroxy Compound)

The aromatic carbonate repeating unit (B) is derived from an aromatic dihydroxy compound.

Examples of the aromatic dihydroxy compound can include compounds each represented by the following general formula (2), and one kind thereof may be used alone, or two or more kinds thereof may be used.

[Chem. 6]

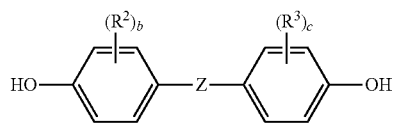

(2)

In the general formula (2), $R^2$ and $R^3$ each represent an atom of a halogen such as fluorine, chlorine, bromine, or iodine, or an alkyl group having 1 to 20 carbon atoms such as a methyl group, an ethyl group, a n-propyl group, an isopropyl group, a n-butyl group, an isobutyl group, a sec-butyl group, a tert-butyl group, a pentyl group, a hexyl group, a cyclohexyl group, a heptyl group, or an octyl group. $R^2$ and $R^3$ may be identical to or different from each other. In addition, when a plurality of $R^2$'s exist, the plurality of $R^2$'s may be identical to or different from each other, and when a plurality of $R^3$'s exist, the plurality of $R^3$'s may be identical to or different from each other. b and c each represent an integer of from 0 to 4. In addition, Z represents a single bond, an alkylene group having 1 to 20 carbon atoms, an alkylidene group having 2 to 20 carbon atoms, a cycloalkylene group having 5 to 20 carbon atoms, a cycloalkylidene group having 5 to 20 carbon atoms, —S—, —SO—, —SO$_2$—, —O—, —CO—, or a bond represented by the following formula (3) or (3').

[Chem. 7]

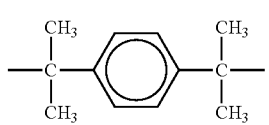

(3)

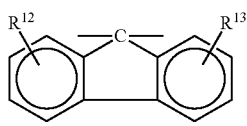

(3')

In the general formula (3'), $R^{12}$ and $R^{13}$ each represent a hydrogen atom, a fluorine atom, a chlorine atom, a bromine atom, an iodine atom, or an alkyl group having 1 to 9 carbon atoms, an alkoxy group having 1 to 5 carbon atoms, an alkenyl group having 2 to 12 carbon atoms, or an aryl group having 6 to 12 carbon atoms, each of which may have a substituent.

In Z in the general formula (2), examples of the alkylene group having 1 to 20 carbon atoms and the alkylidene group having 2 to 20 carbon atoms include a methylene group, an ethylene group, a propylene group, a butylene group, a pentylene group, a hexylene group, an ethylidene group, and an isopropylidene group. Examples of the cycloalkylene group having 5 to 20 carbon atoms and the cycloalkylidene group having 5 to 20 carbon atoms include a cyclopentylene group, a cyclohexylene group, a cyclopentylidene group, and a cyclohexylidene group.

Examples of the aromatic dihydroxy compound represented by the general formula (2) include bis(hydroxyaryl) alkanes such as bis(4-hydroxyphenyl)methane; bis(3-methyl-4-hydroxyphenyl)methane; bis(3-chloro-4-hydroxyphenyl)methane; bis(3,5-dibromo-4-hydroxyphenyl)methane; 1,1-bis(4-hydroxyphenyl)ethane; 1,1-bis(2-t-butyl-4-hydroxy-3-methylphenyl)ethane; 1-phenyl-1,1-bis(3-fluoro-4-hydroxy-3-methylphenyl)ethane; 2,2-bis(4-hydroxyphenyl)propane (common name: bisphenol A); 2,2-bis(3-methyl-4-hydroxyphenyl)propane; 2,2-bis(2-methyl-4-hydroxyphenyl)propane; 2,2-bis(3,5-dimethyl-4-hydroxyphenyl)propane; 1,1-bis(2-t-butyl-4-hydroxy-5-methylphenyl)propane; 2,2-bis(3-chloro-4-hydroxyphenyl)propane; 2,2-bis(3-fluoro-4-hydroxyphenyl)propane; 2,2-bis(3-bromo-4-hydroxyphenyl)propane; 2,2-bis(3,5-difluoro-4-hydroxyphenyl)propane; 2,2-bis(3,5-dichloro-4-hydroxyphenyl)propane; 2,2-bis(3,5-dibromo-4-hydroxyphenyl)propane; 2,2-bis(4-hydroxyphenyl)butane; 2,2-bis(4-hydroxyphenyl)octane; 2,2-bis(4-hydroxyphenyl)phenylmethane; 2,2-bis(4-hydroxy-3-methylphenyl)propane; 1,1-bis(4-hydroxy-3-t-butylphenyl)propane; 2,2-bis(4-hydroxy-3-bromophenyl)propane; 2,2-bis(3-bromo-4- hydroxy-5-chlorophenyl)propane; 2,2-bis(3-phenyl-4-hydroxyphenyl)propane; 2,2-bis(4-hydroxyphenyl)butane; 2,2-bis(3-methyl-4-hydroxyphenyl)butane; 1,1-bis(2-butyl-4-hydroxy-5-methylphenyl)butane; 1,1-bis(2-t-butyl-4-hydroxy-5-methylphenyl)butane; 1,1-bis(2-t-butyl-4-hydroxy-5-methylphenyl)isobutane; 1,1-bis(2-t-amyl-4-hydroxy-5-methylphenyl)butane; 2,2-bis(3,5-dichloro-4-hydroxyphenyl)butane; 2,2-bis(3,5-dibromo-4-hydroxyphenyl)butane; 4,4-bis(4-hydroxyphenyl)heptane; 1,1-bis(2-t-butyl-4-hydroxy-5-methylphenyl)heptane; and 1,1-(4-hydroxyphenyl)ethane; bis(hydroxyaryl)cycloalkanes such as 1,1-bis(4-hydroxyphenyl)cyclopentane; 1,1-bis(4-hydroxyphenyl)cyclohexane; 1,1-bis(3-methyl-4-hydroxyphenyl)cyclohexane; 1,1-bis(3-cyclohexyl-4-hydroxyphenyl)cyclohexane; 1,1-bis(3-phenyl-4-hydroxyphenyl)cyclohexane; and 1,1-bis(4-hydroxyphenyl)-3,5,5-trimethylcyclohexane; bis(hydroxyaryl)ethers such as bis(4-hydroxyphenyl) ether; and bis(4-hydroxy-3-methylphenyl) ether; bis(hydroxyaryl) sulfides such as bis(4-hydroxyphenyl) sulfide; and bis(3-methyl-4-hydroxyphenyl) sulfide; bis(hydroxyaryl) sulfoxides such as bis(4-hydroxyphenyl) sulfoxide; bis(3-methyl-4-hydroxyphenyl) sulfoxide; and bis(3-phenyl-4-hydroxyphenyl) sulfoxide; bis(hydroxyaryl) sulfones such as bis(4-hydroxyphenyl) sulfone; bis(3-methyl-4-hydroxyphenyl) sulfone; and bis(3-phenyl-4-hydroxyphenyl) sulfone; dihydroxybiphenyls such as 4,4'-dihydroxybiphenyl; 4,4'-dihydroxy-2,2'-dimethylbiphenyl; 4,4'-dihydroxy-3,3'-dimethylbiphenyl; 4,4'-dihydroxy-3,3'-dicyclohexylbiphenyl; and 3,3'-difluoro-4,4'-dihydroxybiphenyl; and 9,9-bis(hydroxyphenyl)fluorenes such as 9,9-bis(4-hydroxyphenyl)fluorene, 9,9-bis(4-hydroxy-3-methylphenyl)fluorene, and 9,9-bis(4-hydroxy-2-methylphenyl) fluorene.

Dihydroxybenzenes, and halogen- and alkyl-substituted dihydroxybenzenes are given as an aromatic dihydroxy compound other than the general formula (2). Examples thereof include resorcin, 4-methylresorcin, 4-ethylresorcin, 4-propylresorcin, 4-butylresorcin, 4-t-butylresorcin, 4-phenylresorcin, 4-cumylresorcin; 2,4,5,6-tetrafluororesorcin; 2,4,5,6-tetrabromoresorcin; catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone; 2,5-dichlorohydroquinone; 2,3,5,6-tetramethylhydroquinone; 2,3,5,6-tetra-t-butylhydroquinone; 2,3,5,6-tetrafluorohydroquinone; and 2,3,5,6-tetrabromohydroquinone.

As an aromatic dihydroxy compound other than the general formula (2), a polyorganosiloxane (POS) represented by the following general formula (III), a phenol-modified hydroxy compound represented by the following general formula (V), 9,9-bis(4-hydroxyalkylphenyl)fluorenes represented by the following general formula (VI), or the like may also be used.

[Chem. 8]

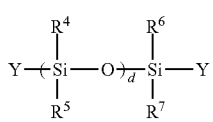

(III)

In the general formula (III), $R^4$, $R^5$, $R^6$, and $R^7$ each independently represent a hydrogen atom, a halogen atom, or an alkyl group having 1 to 6 carbon atoms, an alkoxy group having 1 to 6 carbon atoms, or an aryl group having 6 to 12 carbon atoms, Y represents a phenol residue having a trimethylene group represented by the following formula (IV), and d represents from 70 to 1,000.

[Chem. 9]

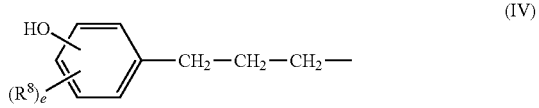

(IV)

In the formula (IV), $R^8$ represents an alkyl group having 1 to 4 carbon atoms or an alkoxy group having 1 to 4 carbon atoms, and e represents an integer of from 0 to 4. When a plurality of $R^8$'s exist, the plurality of $R^8$'s may be identical to or different from each other. Preferred examples of the phenol residue having a trimethylene group include an allylphenol residue and a eugenol residue, and particularly preferred examples of the phenol residue having a trimethylene group include a 2-allylphenol residue and a eugenol residue represented by the following formulae.

[Chem. 10]

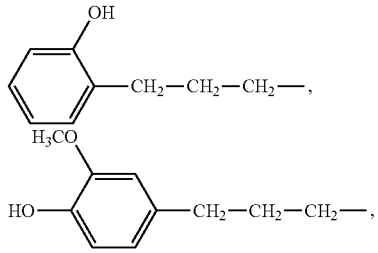

Specific examples of the polyorganosiloxane represented by the general formula (III) include compounds represented by the following general formulae (a) to (c).

[Chem. 11]

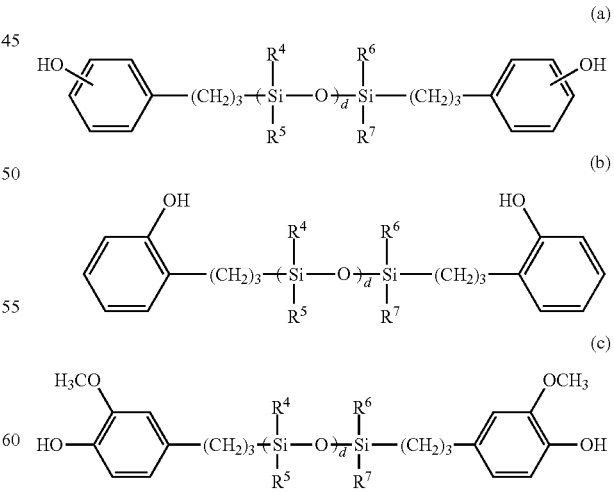

In the formulae (a) to (c), $R^4$ to $R^7$ and d are as described above.

Among the general formulae (a) to (c), α,ω-bis[3-(2-hydroxyphenyl)propyl]polydimethylsiloxane represented by the general formula (b), or α,ω-bis[3-(4-hydroxy-3-methoxyphenyl)propyl]polydimethylsiloxane represented by the general formula (c) is preferred from the viewpoint of ease of availability.

[Chem. 12]

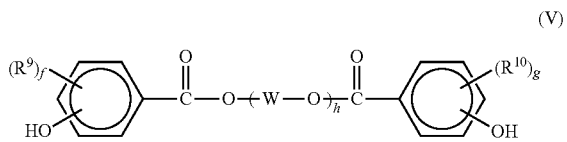

(V)

In the general formula (V), $R^9$ and $R^{10}$ each independently represent an alkyl group having 1 to 3 carbon atoms, W represents a linear or branched alkylene group having 2 to 15 carbon atoms, f and g each independently represent an integer of from 0 to 4, and h represents an integer of from 2 to 450.

Examples of the alkyl group represented by $R^9$ or $R^{10}$ include a methyl group, an ethyl group, a n-propyl group, and an isopropyl group. When a plurality of $R^9$'s exist, the plurality of $R^9$'s may be identical to or different from each other. When a plurality of $R^{10}$'s exist, the plurality of $R^{10}$'s may be identical to or different from each other. Examples of the linear or branched alkylene group having 2 to 15 carbon atoms represented by W include: alkylene groups such as an ethylene group, a propylene group, a butylene group, an isobutylene group, a pentylene group, and an isopentylene group; and alkylidene residues such as an ethylidene group, a propylidene group, an isopropylidene group, a butylidene group, an isobutylidene group, a pentylidene group, and an isopentylidene group. h represents preferably from 2 to 200, more preferably from 6 to 70.

[Chem. 13]

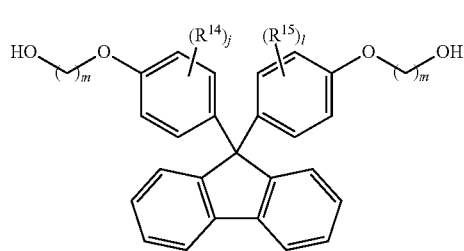

(VI)

In the general formula (VI), $R^{14}$ and $R^{15}$ each represent a methyl group, j and l each represent an integer of from 0 to 2, and m's each represent an integer of from 1 to 6.

Examples of the aromatic dihydroxy compound represented by the general formula (VI) include 9,9-bis(4-(2-hydroxyethoxy)phenyl)fluorene, 9,9-bis(4-(2-hydroxyethoxy)-3-methylphenyl)fluorene, and 9,9-bis(4-(2-hydroxyethoxy)-3,5-dimethylphenyl)fluorene. Among them, 9,9-bis(4-(2-hydroxyethoxyl)phenyl)fluorene is preferred.

(Composition Ratio)

With regard to the composition ratio of the polycarbonate resin in the polycarbonate resin composition of the present invention, the molar ratio (A/B) of the aliphatic carbonate repeating unit (A) to the aromatic carbonate repeating unit (B) is preferably from 100/0 to 0.5/99.5, more preferably from 95/5 to 20/80, still more preferably from 95/5 to 40/60.

When the ratio of the aliphatic carbonate repeating unit is increased, the Abbe number of the resin easily increases. In other words, a region having small chromatic aberration can be obtained.

In addition, when a polycarbonate resin containing the aliphatic carbonate repeating unit (A) is used, a polycarbonate resin molded article additionally excellent in scratch resistance, weatherability, and parallel ray transmittance as compared with a polycarbonate formed only of the aromatic carbonate repeating unit (B) can be obtained.

The composition ratio can be adjusted to a desired one by using one kind of copolymers each having the aliphatic carbonate repeating unit (A) and the aromatic carbonate repeating unit (B) alone, or by blending two or more kinds thereof appropriately combined.

The composition of the polycarbonate resin in the polycarbonate resin composition of the present invention may contain a repeating unit derived from any other dihydroxy compound in addition to the repeating units (A) and (B) as long as the effects of the resin are not impaired. The ratio of the other repeating unit is preferably 10 mol % or less with respect to the total number of moles of the repeating units (A) and (B). The molar ratio is calculated through measurement by proton NMR.

The viscosity-average molecular weight of the polycarbonate resin in the polycarbonate resin composition of the present invention is typically from 10,000 to 50,000. When the viscosity-average molecular weight falls within the range, balance between its mechanical properties and flowability is excellent. The viscosity-average molecular weight is preferably from 10,000 to 35,000, more preferably from 10,000 to 22,000. The viscosity-average molecular weight (Mv) is calculated from the following equation by using a limiting viscosity [η] determined through the measurement of the viscosity of a methylene chloride solution at 20° C. with an Ubbelohde-type viscometer.

$[\eta]=1.23\times10^{-5}Mv^{0.83}$

The refractive index of the polycarbonate resin in the polycarbonate resin composition of the present invention is not particularly limited. However, for example, its refractive index for light having a wavelength of 589.3 nm is preferably from 1.450 to 1.590, more preferably from 1.470 to 1.570, still more preferably from 1.490 to 1.550.

A difference (nF-nC) between the refractive index (nF) of the polycarbonate resin for light having a wavelength of 486.1 nm and its refractive index (nC) for light having a wavelength of 656.3 nm is preferably 0.015 or less, more preferably 0.013 or less, still more preferably 0.011 or less.

The Abbe number of the polycarbonate resin of the present invention is preferably 35 or more, more preferably 40 or more, still more preferably 45 or more from the viewpoint of reducing chromatic aberration.

The glass transition temperature of the polycarbonate resin is preferably from 75 to 175° C., more preferably from 80 to 170° C., still more preferably from 90 to 165° C. When the glass transition temperature of the polycarbonate resin is excessively low, the number of applications where the resin can be used is limited. When the glass transition temperature is excessively high, the resin is poor in melt flowability in its molding and hence the molding cannot be performed in a temperature range where the extent of the decomposition of the polymer is small.

(Production of Polycarbonate Resin)

In the present invention, a method of producing the polycarbonate resin is not particularly limited and resins produced by various conventional methods can each be used. For example, a resin produced by causing a dihydroxy compound and a carbonate precursor to react with each other according to a solution method (interfacial polycondensation method) or a melting method (ester exchange method), i.e., a resin produced by the interfacial polycondensation method involving causing the dihydroxy compound and the carbonate precursor such as phosgene to react with each other in the presence of a chain-end terminator or by causing the dihydroxy compound and a carbonic acid diester to react with each other in the presence of the chain-end terminator according to the ester exchange method or the like can be used.

In the present invention, the ester exchange method is preferred as the method of producing the polycarbonate resin.

(Carbonic Acid Diester)

The carbonic acid diester to be used in the ester exchange method is at least one kind of compound selected from a diaryl carbonate compound, a dialkyl carbonate compound, and an alkyl aryl carbonate compound.

The diaryl carbonate compound is a compound represented by the following general formula (4) or a compound represented by the following general formula (5).

[Chem. 14]

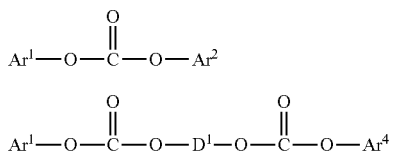

In the formula (4), $Ar^1$ and $Ar^2$ each represent an aryl group, and the groups may be identical to or different from each other.

In the formula (5), $Ar^3$ and $Ar^4$ each represent an aryl group, and the groups may be identical to or different from each other, and $D^1$ represents a residue obtained by removing two hydroxyl groups from the aromatic dihydroxy compound.

In addition, the dialkyl carbonate compound is a compound represented by the following general formula (6) or a compound represented by the following general formula (7).

[Chem. 15]

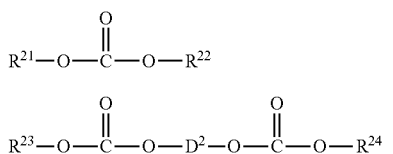

In the formula (6), $R^{21}$ and $R^{22}$ each represent an alkyl group having 1 to 20 carbon atoms or a cycloalkyl group having 4 to 20 carbon atoms, and the groups may be identical to or different from each other.

In the formula (7), $R^{23}$ and $R^{24}$ each represent an alkyl group having 1 to 20 carbon atoms or a cycloalkyl group having 4 to 20 carbon atoms, and the groups may be identical to or different from each other, and $D^2$ represents a residue obtained by removing two hydroxyl groups from the aromatic dihydroxy compound.

In addition, the alkyl aryl carbonate compound is a compound represented by the following general formula (8) or a compound represented by the following general formula (9).

[Chem. 16]

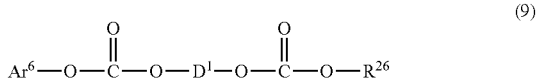

In the formula (8), $Ar^5$ represents an aryl group, and $R^{25}$ represents an alkyl group having 1 to 20 carbon atoms or a cycloalkyl group having 4 to 20 carbon atoms.

In the formula (9), $Ar^6$ represents an aryl group, $R^{26}$ represents an alkyl group having 1 to 20 carbon atoms or a cycloalkyl group having 4 to 20 carbon atoms, and $D^1$ represents a residue obtained by removing two hydroxyl groups from the aromatic dihydroxy compound.

Here, examples of the diaryl carbonate compound include diphenyl carbonate, ditolyl carbonate, bis(chlorophenyl) carbonate, bis(m-cresyl) carbonate, dinaphthyl carbonate, bis(diphenyl) carbonate, and bisphenol A bisphenyl carbonate.

In addition, examples of the dialkyl carbonate compound include diethyl carbonate, dimethyl carbonate, dibutyl carbonate, dicyclohexyl carbonate, and bisphenol A bismethyl carbonate.

Further, examples of the alkyl aryl carbonate compound include methyl phenyl carbonate, ethyl phenyl carbonate, butyl phenyl carbonate, cyclohexyl phenyl carbonate, and bisphenol A methyl phenyl carbonate.

In the present invention, one kind of the compounds is, or two or more kinds thereof are each, appropriately selected and used as the carbonic acid diester. Among them, diphenyl carbonate is preferably used.

In addition, in the ester exchange method, a raw material except the dihydroxy compound and the carbonic acid diester may be used.

For example, as a diester of a dihydroxy compound, there may be given, for example, diacetate of bisphenol A, dipropionate of bisphenol A, dibutyrate of bisphenol A, and dibenzoate of bisphenol A.

In addition, as a dicarbonate of a dihydroxy compound, there may be given, for example, bismethyl carbonate of bisphenol A, bisethyl carbonate of bisphenol A, and bisphenyl carbonate of bisphenol A.

Further, as a monocarbonate of a dihydroxy compound, there may be given, for example, bisphenol A monomethyl carbonate, bisphenol A monoethyl carbonate, bisphenol A monopropyl carbonate, and bisphenol A monophenyl carbonate.

(Chain-End Terminator)

In the production of the polycarbonate, a chain-end terminator may be used as required. Examples of the chain-end terminator include monohydric phenols such as o-n-butylphenol; m-n-butylphenol; p-n-butylphenol; o-isobutylphenol; m-isobutylphenol; p-isobutylphenol; o-t-butylphenol; m-t-butylphenol; p-t-butylphenol; o-n-pentylphenol; m-n-pentylphenol; p-n-pentylphenol; o-n-hexylphenol; m-n-hexylphenol; p-n-hexylphenol; o-cyclohexylphenol; m-cyclohexylphenol; p-cyclohexylphenol; o-phenylphenol;

m-phenylphenol; p-phenylphenol; o-n-nonylphenol; m-n-nonylphenol; p-n-nonylphenol; o-cumylphenol; m-cumylphenol; p-cumylphenol; o-naphthylphenol; m-naphthylphenol; p-naphthylphenol; 2,6-di-t-butylphenol; 2,5-di-t-butylphenol; 2,4-di-t-butylphenol; 3,5-di-t-butylphenol; 2,5-dicumylphenol; 3,5-dicumylphenol; compounds represented by the following formulae,

[Chem. 17]

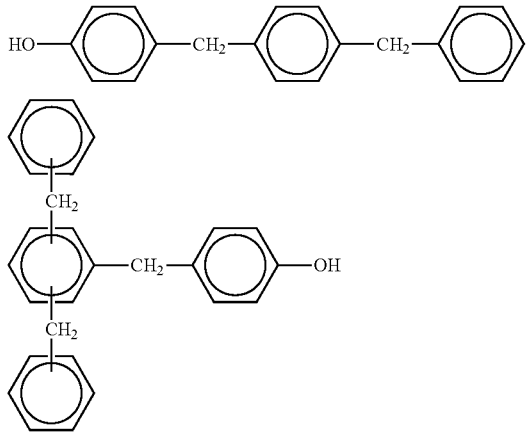

and chromane derivatives represented by the following formulae.

[Chem. 18]

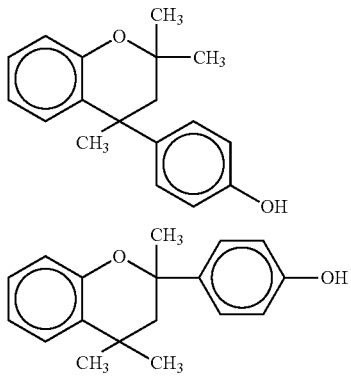

In the present invention, among such phenols, p-t-butylphenol, p-cumylphenol, p-phenylphenol, and the like are preferred, but the chain-end terminator is not particularly limited thereto.

In addition, compounds represented by the following formulae and the like may be used.

[Chem. 19]

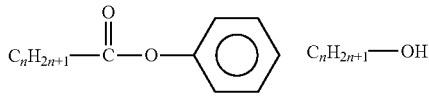

(where n represents an integer of from 7 to 30.)

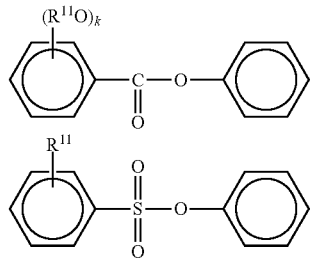

(where $R^{11}$ represents an alkyl group having 1 to 12 carbon atoms and k represents an integer of from 1 to 3.)

In addition, as the chain-end terminator, a compound represented by the following general formula (11) or (12) and the like may be used.

[Chem. 20]

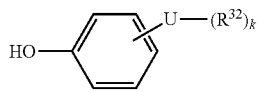

(11)

(12)

In the general formulae (11) and (12), $R^{31}$ and $R^{32}$ each represent an alkyl group having 4 to 30 carbon atoms, an aralkyl group having 7 to 30 carbon atoms, a perfluoroalkyl group having 4 to 30 carbon atoms, or a group represented by the following general formula (13).

[Chem. 21]

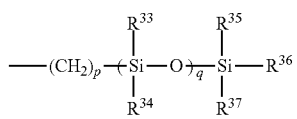

(13)

The alkyl group in $R^{31}$ or $R^{32}$ has preferably 4 to 22, more preferably 8 to 22 carbon atoms. Examples of the alkyl group include a hexyl group, an octyl group, a nonyl group, a decyl group, an undecyl group, a dodecyl group, a pentadecyl group, a hexadecyl group, and an octadecyl group.

The aralkyl group in $R^{31}$ or $R^{32}$ has preferably 8 to 20, more preferably 10 to 20 carbon atoms. Examples of the aralkyl group include a benzyl group, a phenethyl group, a methylbenzyl group, a 2-phenylpropan-2-yl group, and a diphenylmethyl group.

The perfluoroalkyl group in $R^{31}$ or $R^{32}$ has preferably 2 to 20 carbon atoms. Examples of the perfluoroalkyl group include a 4,4,5,5,6,6,7,7,7-nonafluoroheptyl group, a 4,4,5,5,6,6,7,7,8,8,9,9,9-tridecafluorononyl group, and a 4,4,5,5,6,6,7,7,8,8,9,9,10,10,11,11,11-heptadecafluoroundecyl group.

In the formula (13), $R^{33}$, $R^{34}$, $R^{35}$, $R^{36}$, and $R^{37}$ each independently represent at least one kind of group selected from the group consisting of an alkyl group having 1 to 10 carbon atoms, a cycloalkyl group having 6 to 20 carbon atoms, an alkenyl group having 2 to 10 carbon atoms, an aryl group having 6 to 10 carbon atoms, and an aralkyl group having 7 to 20 carbon atoms.

It is preferred that in the formula (13), $R^{33}$, $R^{34}$, $R^{35}$, $R^{36}$, and $R^{37}$ each independently represent at least one kind of group selected from the group consisting of an alkyl group having 1 to 10 carbon atoms and an aryl group having 6 to 10 carbon atoms. It is particularly preferred that $R^{33}$, $R^{34}$, $R^{35}$, $R^{36}$, and $R^{37}$ each independently represent at least one kind of group selected from the group consisting of a methyl group and a phenyl group.

In the formula (13), p represents an integer of from 0 to 3, preferably an integer of from 1 to 3, more preferably an integer of from 2 to 3, and q represents an integer of from 4 to 100, preferably an integer of from 4 to 50, more preferably an integer of from 8 to 50.

U in the formula (12) represents at least one kind of bond selected from the group consisting of a single bond, an ether bond, a thioether bond, an ester bond, an amino bond, and an amide bond. U preferably represents at least one kind of bond selected from the group consisting of a single bond, an ether bond, and an ester bond. Among then, a single bond or an ester bond is preferred.

k represents an integer of from 1 to 5, preferably an integer of from 1 to 3, more preferably 1.

The chain-end terminator represented by the formula (11) or (12) is preferably derived from a biogenic substance. Examples of the biogenic substance include long-chain alkyl alcohols each having 14 or more carbon atoms such as cetanol, stearyl alcohol, and behenyl alcohol.

(Branching Agent)

In the present invention, a branching agent can be used as required. Examples of the branching agent include: phloroglucin; trimellitic acid; 1,1,1-tris(4-hydroxyphenyl)ethane; 1-[α-methyl-α-(4'-hydroxyphenyl)ethyl]-4-[α',α'-bis(4"-hydroxyphenyl)ethyl]benzene; α,α',α"-tris(4-hydroxyphenyl)-1,3,5-triisopropylbenzene; and isatinbis(o-cresol).

(Ester Exchange Method)

In the present invention, in the production of a polycarbonate by a normal ester exchange method, the polycarbonate can be obtained by performing an ester exchange reaction through the use of the dihydroxy compound and the carbonic acid diester, and as required, the chain-end terminator, the branching agent, or the like. Specifically, the reaction may be advanced in conformity with a known ester exchange method. Hereinafter, a procedure and conditions for a preferred production method of the present invention are specifically described.

First, the dihydroxy compound and the carbonic acid diester are subjected to an ester exchange reaction at such a ratio that the molar amount of the carbonic acid diester becomes from 0.9 to 1.5 times as large as that of the dihydroxy compound. It should be noted that the molar amount is preferably from 0.98 to 1.20 times depending on the situation.

At the time of the ester exchange reaction, when the chain-end terminator formed of the monohydric phenol or the like is present in an amount within the range of from 0.05 to 10 mol % with respect to the dihydroxy compound, a hydroxyl group terminal of a polycarbonate to be obtained is sealed, and hence a polycarbonate sufficiently excellent in heat resistance and water resistance is obtained. The total amount of such chain-end terminator formed of the monohydric phenol or the like may be added to a reaction system in advance, or the following may be adopted: part of the chain-end terminator is added to the reaction system in advance and the remainder thereof is added thereto in association with the progress of the reaction. Further, in some cases, the total amount of the chain-end terminator may be added to the reaction system after the ester exchange reaction between the dihydroxy compound and the carbonic acid diester has partially progressed.

When the ester exchange reaction is performed, a reaction temperature is not particularly limited, and in normal cases, the temperature is selected from the range of from 100 to 330° C., preferably from the range of from 180 to 300° C.; the following method is more preferably adopted: the temperature is gradually increased to from 180 to 300° C. in accordance with the progress of the reaction. When the temperature of the ester exchange reaction is 100° C. or more, a reaction rate increases. Meanwhile, when the temperature is 330° C. or less, no side reaction occurs and a problem such as the coloring of the polycarbonate to be produced hardly occurs.

In addition, a reaction pressure is set depending on the vapor pressure of a monomer to be used and the reaction temperature. The pressure only needs to be set so that the reaction may be efficiently performed, and is not limited. In normal cases, the following is often adopted: at the initial stage of the reaction, the pressure is set to an atmospheric pressure (normal pressure) to pressurized state ranging from 1 to 50 atm (760 to 38,000 torr), and at the later stage of the reaction, the pressure is set to a decompressed state, preferably from 1.33 to $1.33 \times 10^4$ Pa (0.01 to 100 torr) in the end.

Further, the reaction only needs to be performed until a target molecular weight is obtained, and a reaction time is typically from about 0.2 to 10 hours.

The ester exchange reaction, which is typically performed in the absence of an inert solvent, may be performed in the presence of 1 to 150 mass % of the inert solvent with respect to the polycarbonate to be obtained as required. Examples of the inert solvent include: aromatic compounds such as diphenyl ether, halogenated diphenyl ether, benzophenone, polyphenyl ether, dichlorobenzene, and methylnaphthalene; and cycloalkanes such as tricyclo(5,2,10)decane, cyclooctane, and cyclodecane.

In addition, the reaction may be performed under an inert gas atmosphere as required, and examples of the inert gas include various gases such as: gases such as argon, carbon dioxide, dinitrogen monoxide, and nitrogen; chlorofluorohydrocarbons; alkanes such as ethane and propane; and alkenes such as ethylene and propylene.

In addition, in the ester exchange method, a polymerization catalyst can be used for increasing the rate of the polymerization, and examples of such polymerization catalyst include an alkali metal compound, an alkaline earth metal compound, a nitrogen-containing compound, a metal compound, and a combination of a nitrogen-containing organic basic compound and a quaternary phosphonium salt containing an aryl group.

As such compounds, for example, organic acid salts, inorganic salts, oxides, hydroxides, hydrides, alkoxides, and quaternary ammonium hydroxides of alkali metals and alkaline earth metals are preferably used. One kind of those compounds may be used alone, or two or more kinds thereof may be used in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate; disodium salt, dipotassium salt, dicesium salt, and dilithium salt of bisphenol A; and sodium salt, potassium salt, cesium salt, and lithium salt of phenol. One kind of those compounds may be used alone, or two or more kinds thereof may be used in combination.

Example of the alkaline earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, and barium diacetate. One kind of those compounds may be used alone, or two or more kinds thereof may be used in combination.

Examples of the nitrogen-containing compound include: quaternary ammonium hydroxides having an alkyl group, an aryl group, or the like, such as tetramethylammonium hydroxide, tetraethylammonium hydroxide, tetrapropylammonium hydroxide, tetrabutylammonium hydroxide, and trimethylbenzylammonium hydroxide; tertiary amines such as triethylamine, dimethylbenzylamine, and triphenylamine; imidazoles such as 2-methylimidazole, 2-phenylimidazole, and benzimidazole; and bases or basic salts such as ammonia, tetramethylammonium borohydride, tetrabutylammonium borohydride, tetrabutylammonium tetraphenylborate, and tetraphenylammonium tetraphenylborate. One kind of those compounds may be used alone, or two or more kinds thereof may be used in combination.

Examples of the metal compound include a zinc-aluminum compound, a germanium compound, an organotin compound, an antimony compound, a manganese compound, a titanium compound, and a zirconium compound. One kind of those compounds may be used alone, or two or more kinds thereof may be used in combination.

The combination of the nitrogen-containing organic basic compound and the quaternary phosphonium salt containing an aryl group is, for example, a combination of tetramethylammonium hydroxide and tetraphenylphosphonium tetraphenylborate.

The usage of such polymerization catalyst is selected from the range of preferably from $1\times10^{-9}$ to $1\times10^{-2}$ equivalent, more preferably from $1\times10^{-8}$ to $1\times10^{-2}$ equivalent, still more preferably from $1\times10^{-7}$ to $1\times10^{-3}$ equivalent with respect to 1 mol of the dihydroxy compound.

In addition, a catalyst deactivator can be added at the later stage of the reaction. As the catalyst deactivator to be used, a known catalyst deactivator may be effectively used, and among them, ammonium salts or phosphonium salts of sulfonic acid are preferred. Further, salts of dodecylbenzenesulfonic acid such as tetrabutylphosphonium dodecylbenzenesulfonate, or salts of p-toluenesulfonic acid such as tetrabutylammonium p-toluenesulfonate are preferred.

In addition, as esters of sulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, and the like are also preferably used.

Among them, tetrabutylphosphonium dodecylbenzenesulfonate or butyl p-toluenesulfonate is most preferably used. With regard to the usage of such catalyst deactivator, when at least one kind of polymerization catalyst selected from alkali metal compounds and/or alkaline earth metal compounds is used, the catalyst deactivator can be used preferably at a ratio of from 0.5 to 50 mol, more preferably at a ratio of from 0.5 to 10 mol, still more preferably at a ratio of from 0.8 to 5 mol per 1 mol of the catalyst.

The reaction in the ester exchange method may be performed by any one of a continuous system and a batch system. A reactor to be used in melt polymerization may be any one of: a vertical reactor equipped with, for example, an anchor-type stirring blade, a max blend stirring blade, or a helical ribbon-type stirring blade; and a horizontal reactor equipped with, for example, a paddle blade, a lattice blade, or a spectacle blade. Further, the reactor may be of an extruder type equipped with a screw. In the case of the continuous system, an appropriate combination of such reactors is preferably used.

(Interfacial Polycondensation Method)

In the present invention, in the production of the polycarbonate by a normal interfacial polycondensation method, the dihydroxy compound and the carbonate precursor such as phosgene are caused to react with each other in an inert solvent such as methylene chloride in the presence of a known acid acceptor or molecular weight modifier, and further, a catalyst or branching agent added as required.

As the catalyst in the interfacial polycondensation method, a phase-transfer catalyst such as a tertiary amine or a salt thereof, a quaternary ammonium salt, or a quaternary phosphonium salt may be preferably used. Examples of the tertiary amine include triethylamine, tributylamine, N,N-dimethylcyclohexylamine, pyridine, and dimethylaniline. Examples of the tertiary amine salt include hydrochlorides and bromates of those tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide. Examples of the quaternary phosphonium salt include tetrabutylphosphonium chloride and tetrabutylphosphonium bromide. Each of those catalysts may be used alone, or two or more kinds thereof may be used in combination. Among the catalysts, tertiary amines are preferred, and triethylamine is particularly suitable.

Examples of the inert organic solvent include chlorinated hydrocarbons such as: dichloromethane (methylene chloride); trichloromethane; carbon tetrachloride; 1,1-dichloroethane; 1,2-dichloroethane; 1,1,1-trichloroethane; 1,1,2-trichloroethane; 1,1,1,2-tetrachloroethane; 1,1,2,2-tetrachloroethane; pentachloroethane; and chlorobenzene, toluene, and acetophenone. Each of those organic solvents may be used alone, or two or more kinds thereof may be used in combination. Among them, methylene chloride is particularly suitable.

<Polycarbonate Resin Composition>

The polycarbonate resin composition of the present invention contains the polycarbonate resin and the glass filler.

(Contents of Polycarbonate Resin and Glass Filler)

The content of the glass filler in the polycarbonate resin composition of the present invention is preferably from 2 to 40 mass %, more preferably from 5 to 35 mass %, still more preferably from 10 to 30 mass % with respect to the total amount of the polycarbonate resin and the glass filler.

When the content of the glass filler is less than 2 mass %, improvements in mechanical properties of a molded article of the resin composition are not sufficiently obtained. In addition, when the content of the glass filler exceeds 40 mass %, a contact interface between the resin and the glass increases, high transparency of the molded article reduces, and flowability at the time of the molding reduces.

Setting the amount of the glass filler in the polycarbonate resin composition within the range provides a molded article that brings together high transparency and good mechanical properties.

The polycarbonate resin composition of the present invention can realize an improvement in strength such as an elastic modulus by the blending of the glass filler and a low linear expansion coefficient while maintaining the excellent transparency intrinsic to the polycarbonate resin.

(Difference in Refractive Index Between Glass Filler and Polycarbonate Resin)

A difference in refractive index between the glass filler and the polycarbonate resin is preferably 0.004 or less, more preferably 0.003 or less, still more preferably 0.002 or less for light having a wavelength of 486.1 nm, is preferably 0.002 or less, more preferably 0.001 or less for light having a wavelength of 589.3 nm, and is preferably 0.002 or less, more preferably 0.001 or less for light having a wavelength of 656.3 nm.

When the difference in refractive index between the glass filler and the polycarbonate resin is more than 0.004 for light having a wavelength of 486.1 nm, the transparency of the molded article becomes insufficient. In addition, when the difference in refractive index between the glass filler and the polycarbonate resin is more than 0.002 for light having a wavelength of 589.3 nm and/or light having a wavelength of 656.3 nm, the transparency of the molded article becomes insufficient. That is, the sufficient transparency of the molded article can be maintained by setting the difference in refractive index between the glass filler and the polycarbonate resin within the range.

In addition, a region having small chromatic aberration, i.e., a high Abbe number is preferred for adjusting the refractive indices of the polycarbonate resin and the glass filler at each wavelength to each other. From this viewpoint, the Abbe number of each of the glass filler and the polycarbonate resin is preferably 35 or more, more preferably 40 or more, still more preferably 45 or more.

(Additive)

Further, a well-known additive can be used for the polycarbonate resin composition of the present invention as long as its characteristics such as a refractive index are not impaired. For example, an antioxidant can suppress the decomposition of the resin at the time of the production or molding of the polycarbonate resin composition.

In addition, depending on the intended use or as required, additives such as thermal stabilizers, plasticizers, light stabilizers, polymerization metal deactivators, flame retardants, lubricants, antistatic agents, surfactants, antimicrobial agents, UV absorbing agents, and mold releasing agents may be blended in the polycarbonate resin composition.

The polycarbonate resin composition of the present invention can be produced by employing a conventionally known method. For example, the following method can be preferably employed: the polycarbonate resin, the glass filler, and an optional additive are mixed with a mixer or the like, and the mixture is melted and kneaded with an extruder to be pelletized.

<Polycarbonate Resin Composition Molded Article>

A polycarbonate resin molded article of the present invention is obtained by molding the polycarbonate resin composition.

With regard to a method of producing the polycarbonate resin molded article of the present invention, the molded article can be obtained by molding the polycarbonate resin composition according to a conventionally known molding method such as injection molding, extrusion molding, compression molding, or calender molding. In addition, the molding may be performed with a die whose inside has been covered with a resin film or a resin sheet.

The thickness of the molded article can be arbitrarily set depending on applications. In particular, when the transparency of the molded article is required, the thickness is preferably from 0.2 to 4.0 mm, more preferably from 0.3 to 3.0 mm, still more preferably from 0.3 to 2.0 mm. When the thickness of the molded article is 0.2 mm or more, its warping does not occur and good mechanical strength is obtained. In addition, when the thickness of the molded article is 4.0 mm or less, high transparency is obtained.

A coating film formed of a hard coating film, an antifogging film, an antistatic film, or an antireflection film may be formed on the molded article as required, and a composite coating film formed of two or more kinds thereof may be formed.

Among them, a coating film formed of a hard coating film is particularly preferably formed because the film has good weatherability and can prevent the wear of the surface of the molded article with time. A material for the hard coating film is not particularly limited, and a known material such as an acrylate-based hard coating agent, a silicone-based hard coating agent, or an inorganic hard coating agent can be used.

It should be noted that a condition for the production of the polycarbonate resin composition and a condition for the molding of the polycarbonate resin molded article can be appropriately selected, and are not particularly limited. However, in normal cases, it is preferred that a heating temperature at the time of the melting and kneading, and the temperature of the resin at the time of its injection molding be each appropriately selected from the range of from 150° C. to 300° C. in order that the decomposition of the resin may be suppressed.

When at least part of the glass filler is present on the outermost surface of the molded article, the surface roughness of the molded article increases and the degree of irregular reflection at the surface of the molded article increases, and as a result, the transparency of the molded article deteriorates in some cases. In view of the foregoing, for example, a method involving forming a layer containing a high proportion of the resin (skin layer) on the outermost surface of the molded article to reduce the surface roughness of the molded article has been employed as a method of reducing the surface roughness of the molded article. With regard to the method involving forming the skin layer, in the case of injection molding, the temperature of a die is set to a temperature higher than a general condition, whereby the resin in contact with the die easily flows and hence the surface roughness of the outermost surface of the molded article can be reduced. In addition, in the case of compression molding, a pressure at the time of the molding is set to a pressure higher than a general condition, whereby the surface roughness of the outermost surface of the molded article can be reduced. When the surface roughness of the molded article is reduced by employing any such method, the irregular reflection at the surface of the molded article is suppressed and a haze reduces, and as a result, the transparency of the molded article can be improved.

In addition, when the polycarbonate resin molded article thus obtained is molded into a flat plate, the flat plate preferably has a total light transmittance for visible light of 75% or more and a haze of 35% or less. The total light transmittance is more preferably 80% or more, still more preferably 83% or more. In addition, the haze is more preferably 30% or less, still more preferably 25% or less.

The polycarbonate resin molded article having the above-mentioned optical properties can be used in an application where high transparency is required because the molded article is excellent in transparency. It should be noted that the total light transmittance for visible light can be measured in conformity with JIS-K7361 or ASTM D1003, and the haze can be measured in conformity with JIS-K7105 or ASTM D1003.

The molded article of the present invention uses the polycarbonate resin composition containing the aliphatic carbonate repeating unit. Accordingly, a polycarbonate resin molded article excellent in scratch resistance, weatherability, and parallel ray transmittance as compared with a polycarbonate formed only of the aromatic carbonate repeating unit can be obtained.

In addition, the polycarbonate resin molded article of the present invention can be suitably used in members that are each required to have transparency and rigidity, and further, scratch resistance and weatherability such as: (1) automobile parts such as a sunroof, a door visor, a rear window, and a side window; (2) building parts such as a building glass, a soundproof wall, a car port, a sunroom, and gratings; (3) windows for railway vehicles and ships; (4) parts for electrical instruments such as various parts for a television, a radio-cassette recorder, a video camera, a video tape recorder, an audio player, a DVD player, a telephone, a display, a computer, a register, a copying machine, a printer, a facsimile, and the like, and respective parts for outer plates and housings thereof; (5) parts for precision instruments such as casings and covers for precision machines such as a cellular phone, a PDA, a camera, a slide projector, a watch, an electronic calculator, a measuring instrument, and a display instrument; (6) agricultural parts such as a vinyl house and a greenhouse; and (7) furniture parts such as a lighting cover, blinds, and interior tools.

EXAMPLES

Hereinafter the present invention is described in more detail by way of Examples and Comparative Examples, but the present invention is by no means limited thereto.

It should be noted that characteristic values in the respective examples were determined in accordance with the following procedures.

<Composition Ratio Between Repeating Units (A) and (B) of Polycarbonate Resin>

The copolymerization amounts of the repeating units (A) and (B) were calculated by measuring $^1$H-NMR with a nuclear magnetic resonance (NMR)-measuring apparatus (manufactured by JEOL Ltd.; JNM-AL500).

<Viscosity-Average Molecular Weight of Polycarbonate Resin>

A viscosity-average molecular weight (Mv) was calculated from the equation "$[\eta]=1.23\times10^{-5}Mv^{0.83}$" by using a limiting viscosity $[\eta]$ determined through the measurement of the viscosity of a methylene chloride solution at 20° C. with an Ubbelohde-type viscometer.

<Refractive Index and Abbe Number of Polycarbonate Resin>

An Abbe refractometer (MODEL 2010/M PRISM COUPLER manufactured by METRICON), and interference filters for wavelengths of 656.3 nm (C line), 589.3 nm (D line), and 486.1 nm (F line) were used to measure refractive indices nC, nD, and nF at the respective wavelengths.

A measurement sample was obtained as follows: a plate having a thickness of 1 mm was produced by subjecting the resin to compression molding at from 130 to 220° C., and was defined as a measurement test piece.

<Glass Transition Temperature Tg of Polycarbonate Resin>

The glass transition temperature of the polycarbonate resin was measured with a thermal analysis system DSC-2910 manufactured by TA Instruments in conformity with JIS K7121 under a nitrogen atmosphere (nitrogen flow rate: 40 ml/min) and under the condition of a rate of temperature increase of 20° C./min.

<Refractive Index, Specific Gravity, and Abbe Number of Glass Filler>

The refractive index of the glass filler is a value obtained from measurement performed on a test piece by an immersion method based on the method B of JIS-K7142, and its Abbe number was calculated from the resultant refractive index. Its specific gravity is a value measured by Archimedes' method.

<Evaluation of Polycarbonate Resin Composition for Performance>

(1) Total Light Transmittance and Haze Value

A total light transmittance as an optical property of a polycarbonate resin molded article is a value obtained from measurement performed on a sample having a thickness of 2 mm with an NDH SENSOR manufactured by NIPPON DENSHOKU INDUSTRIES, CO., LTD. in conformity with ASTM D1003. A haze value is a value obtained from measurement performed on the sample having a thickness of 2 mm with the NDH SENSOR manufactured by NIPPON DENSHOKU INDUSTRIES, CO., LTD. in conformity with ASTM D1003.

Production Example 1

Production of Polycarbonate Resin 165.89 Grams (1.152 mol) of 1,4-cyclohexanedimethanol (CHDM) as an aliphatic dihydroxy compound, 10.94 g (0.048 mol) of bisphenol A (BPA) as an aromatic dihydroxy compound, 269.64 g (1.26 mol) of diphenyl carbonate as a carbonic acid diester, 1.44 ml of a 15 wt % aqueous solution of tetramethylammonium hydroxide, and 24 µL of a 0.1 mol/L aqueous solution of sodium hydroxide were loaded into a reaction vessel provided with a stirring apparatus, a distiller, and a decompression apparatus, and air in the reaction vessel was replaced with nitrogen, followed by the melting of the mixture at 140° C. After the mixture had been stirred for 30 minutes, while a temperature in the reaction vessel was increased to 180° C., a pressure therein was gradually reduced and the mixture was subjected to a reaction at 13.3 kPa for 30 minutes, followed by the removal of produced phenol by distillation. Next, while the pressure was maintained at the above-mentioned value, the temperature was continuously increased, and the resultant was subjected to a reaction at 190° C. for 30 minutes and at 200° C. for 30 minutes. After that, the resultant was subjected to a reaction at 210° C. for 30 minutes, at 220° C. for 30 minutes, and at 240° C. for 30 minutes, followed by the removal of phenol by distillation. After that, the pressure was slowly reduced and set to 133 Pa or less at 240° C., and was held at this value for 30 minutes. After that, the degree of vacuum was additionally increased, and after a full vacuum had been reached, the resultant was subjected to a reaction for 4 hours under stirring. After that, 16 µL of a 10 vol % solution of butyl p-toluenesulfonate in toluene was added as a deactivator to the resultant, and then the mixture was stirred at 240° C. and 13.3 kPa for 20 minutes to provide a target copolymerized polycarbonate (PC1). Table 1 shows the results of the measurement of the viscosity-average molecular weight, refractive index (nF) for light having a wavelength of 486.1 nm, refractive index (nD) for light having a wavelength of 589.3 nm, refractive index (nC) for light having a wavelength of 656.3 nm, Abbe number, and glass transition temperature of the PC1.

Production Example 2

A target copolymerized polycarbonate (PC2) was obtained by performing exactly the same operations as those of Production Example 1 except that: the aliphatic dihydroxy compound used in Production Example 1 was changed to CHDM and isosorbide (ISB); 80.784 g (0.561 mol) of CHDM and 81.985 g (0.561 mol) of ISB were used; and the usage of BPA was changed to 17.784 g (0.078 mol). Table 1 shows the results.

Production Example 3

A target copolymerized polycarbonate (PC3) was obtained by performing exactly the same operations as those of Production Example 1 except that: the aliphatic dihydroxy compound used in Production Example 1 was changed to ISB and tricyclodecanedimethanol (TCDDM); 70.585 g (0.483 mol) of ISB and 95.668 g (0.483 mol) of TCDDM were used; and the usage of BPA was changed to 53.352 g (0.234 mol). Table 1 shows the results.

Production Example 4

A target copolymerized polycarbonate (PC4) was obtained by performing exactly the same operations as those of Production Example 1 except that: the aliphatic dihydroxy compound used in Production Example 1 was changed to TCDDM; 136.416 g (0.696 mol) of TCDDM was used; and the usage of BPA was changed to 114.912 g (0.504 mol). Table 1 shows the results.

Production Example 9

67.45 Grams (0.462 mol) of isosorbide (ISB) as an aliphatic dihydroxy compound, 31.46 g (0.138 mol) of bisphenol A (BPA) as an aromatic dihydroxy compound, 132.25 g (0.618 mol) of diphenyl carbonate as a carbonic acid diester, 0.73 ml of a 15 wt % aqueous solution of tetramethylammonium hydroxide, and 30 μL of a 0.1 mol/L aqueous solution of sodium hydroxide were loaded into a reaction vessel provided with a stirring apparatus, a distiller, and a decompression apparatus, and air in the reaction vessel was replaced with nitrogen.

A temperature in the reaction vessel was increased to 180° C. and the mixture was subjected to a reaction for 15 minutes. After that, a pressure in the reaction vessel was gradually reduced and the resultant was subjected to a reaction at 13.3 kPa for 20 minutes, followed by the removal of produced phenol by distillation.

Next, while the temperature was increased to 200° C., the pressure was reduced to 4 kPa and the resultant was subjected to a reaction for 20 minutes. Further, the temperature was increased to 220° C. and then the pressure was gradually reduced to 0.13 kPa, followed by the removal of phenol by distillation. Further, the temperature was increased to 250° C. and the resultant was subjected to a reaction at 0.07 kPa for 1 hour under stirring.

After that, 8 μL of a 10 vol % solution of butyl p-toluenesulfonate in toluene was added as a deactivator to the resultant, and then the mixture was stirred at 250° C. and 13.3 kPa for 20 minutes to provide a target copolymerized polycarbonate (PC6).

Table 1 shows the results of the measurement of the viscosity-average molecular weight, refractive index (nF) for light having a wavelength of 486.1 nm, refractive index (nD) for light having a wavelength of 589.3 nm, refractive index (nC) for light having a wavelength of 656.3 nm, Abbe number, and glass transition temperature of the PC6.

Production Example 10

A target copolymerized polycarbonate (PC7) was obtained by performing exactly the same operations as those of Production Example 9 except that: the usage of ISB as the aliphatic dihydroxy compound used in Production Example 9 was changed to 66.58 g (0.456 mol); and the usage of BPA as the aromatic dihydroxy compound was changed to 32.83 g (0.144 mol). Table 1 shows the results.

TABLE 1

| | Polycarbonate | Production Example 1 | Production Example 2 | Production Example 3 | Production Example 4 | | Production Example 9 | Production Example 10 |
|---|---|---|---|---|---|---|---|---|
| Kind | | PC1 | PC2 | PC3 | PC4 | PC5*[2] | PC6 | PC7 |
| Repeating unit (A) | Aliphatic dihydroxy compound*[1] | CHDM | CHDM/ISB*[3] | TCDDM/ISB*[4] | TCDDM | — | ISB | ISB |
| Repeating unit (B) | Aromatic dihydroxy compound*[1] | BPA | BPA | BPA | BPA | BPA | BPA | BPA |
| Composition ratio | (A)/(B) molar ratio | 96/4 | 93.5/6.5 | 80.5/19.5 | 58/42 | 0/100 | 77/23 | 76/24 |
| Characteristic | Viscosity-average molecular weight | 16,600 | 12,200 | 14,000 | 12,100 | 19,500 | 10,900 | 12,100 |
| | Refractive index (nF) | 1.515 | 1.516 | 1.542 | 1.565 | 1.600 | 1.540 | 1.542 |
| | Refractive index (nD) | 1.509 | 1.509 | 1.533 | 1.555 | 1.585 | 1.532 | 1.533 |
| | Refractive index (nC) | 1.506 | 1.506 | 1.530 | 1.551 | 1.580 | 1.529 | 1.530 |
| | Refractive index difference (nF − nC) | 0.010 | 0.010 | 0.012 | 0.014 | 0.020 | 0.011 | 0.012 |
| | Abbe number | 52.8 | 51.1 | 45.5 | 39.8 | 29.3 | 48.4 | 44.3 |
| | Glass transition temperature (° C.) | 45 | 101 | 119 | 100 | 145 | 146 | 149 |

*[1]CHDM: cyclohexanedimethanol
TCDDM: tricyclodecanedimethanol
ISB: isosorbide
BPA: bisphenol A
*[2]PC5: TARFLON FN1900 [manufactured by Idemitsu Kosan Co., Ltd.]
*[3]CHDM/ISB = 1:1 (molar ratio)
*[4]TCDDM/ISB = 1:1 (molar ratio)

Production Examples 5 to 8, 11 and 12

Production of Glass Fibers

Glass fibers GF1 to GF6 were produced according to compositions (mass %) shown in Table 2.

It should be noted that: the glass fibers were each spun by a conventionally known method so as to have a fiber diameter of 15 μm; in each of Production Examples 5, 7 and 8, aminosilane and urethane whose total amount had been adjusted to 0.5 mass % with respect to the glass fibers were caused to adhere as binders to the glass fibers; in Production Example 6, aminosilane and an epoxy that had been similarly adjusted were caused to adhere as binders to the glass fibers; and in each of Production Examples 11 and 12, aminosilane and urethane that had been similarly adjusted were caused to adhere as binders to the glass fibers. Table 2 shows the results of the measurement of the refractive indices (nF) for light having a wavelength of 486.1 nm, refractive indices (nD) for light having a wavelength of 589.3 nm, refractive indices (nC) for light having a wavelength of 656.3 nm, specific gravities, and Abbe numbers of the glass fibers GF1 to GF6 obtained in the foregoing.

TABLE 2

| | | Production Example 5 GF1 | Production Example 6 GF2 | Production Example 7 GF3 | Production Example 8 GF4 | Production Example 11 GF5 | Production Example 12 GF6 |
|---|---|---|---|---|---|---|---|
| Composition | $SiO_2$ | 71.0 | 66.5 | 55.1 | 57.5 | 64.0 | 63.6 |
| (mass %) | $Al_2O_3$ | 4.0 | 5.7 | 14.0 | 12.0 | 8.3 | 8.3 |
| | $B_2O_3$ | 4.0 | 0.0 | 6.0 | 0.0 | 5.7 | 5.7 |
| | MgO | 3.0 | 1.6 | 0.4 | 2.5 | 3.3 | 2.6 |
| | CaO | 7.1 | 10.8 | 23.0 | 21.0 | 15.6 | 15.5 |
| | ZnO | 0.0 | 0.0 | 0.0 | 1.5 | 0.0 | 0.0 |
| | SrO | 0.0 | 0.0 | 0.0 | 0.0 | 0.0 | 0.0 |
| | BaO | 0.0 | 0.0 | 0.0 | 0.0 | 0.0 | 0.0 |
| | $Na_2O$ | 10.9 | 7.0 | 0.7 | 0.5 | 3.0 | 3.0 |
| | $K_2O$ | 0.0 | 4.5 | 0.0 | 0.0 | 0.0 | 0.0 |
| | $Li_2O$ | 0.0 | 0.0 | 0.0 | 0.0 | 0.0 | 0.0 |
| | $TiO_2$ | 0.0 | 3.9 | 0.0 | 5.0 | 0.0 | 1.3 |
| | $Fe_2O_3$ | 0.0 | 0.0 | 0.2 | 0.0 | 0.0 | 0.0 |
| | $F_2$ | 0.0 | 0.0 | 0.6 | 0.0 | 0.0 | 0.0 |
| | $SiO_2 + Al_2O_3$ | 75.0 | 72.2 | 69.1 | 69.5 | 72.3 | 71.9 |
| | CaO + ZnO + SrO + BaO | 7.1 | 10.8 | 23.0 | 22.5 | 15.6 | 15.5 |
| | $Na_2O + K_2O + Li_2O$ | 10.9 | 11.5 | 0.7 | 0.5 | 3.0 | 3.0 |
| Characteristic | Refractive index (nF) | 1.515 | 1.541 | 1.562 | 1.593 | 1.539 | 1.541 |
| | Refractive index (nD) | 1.509 | 1.534 | 1.555 | 1.585 | 1.532 | 1.534 |
| | Refractive index (nC) | 1.507 | 1.531 | 1.552 | 1.582 | 1.530 | 1.531 |
| | Specific gravity | 2.44 | 2.52 | 2.54 | 2.71 | — | — |
| | Abbe number | 63.6 | 53.4 | 55.5 | 53.2 | 60 | 56 |

Examples 1 to 6, and Comparative Examples 1 and 2

Production of Glass Fiber-Reinforced Polycarbonate Resin Molded Article

Polycarbonate resin composition molded articles of Examples 1 to 6 were produced by performing compounding through the use of the polycarbonate resins obtained in Production Examples 1 to 4, 9 and 10, and the glass fibers obtained in Production Examples 5 to 8, 11 and 12 as glass fillers according to compositions (mass %) shown in Table 3 and under the following conditions.

The polycarbonate resins obtained in Production Examples 1 to 4, 9 and 10, and the glass fibers obtained in Production Examples 5 to 8, and 11 and 12 were blended at ratios shown in Table 3. The mixture was supplied to an extruder (model name: Micro Twin Screw compounder (manufactured by DSM)), and was melted and kneaded at an extrusion temperature of from 170° C. to 300° C. The resultant was subjected to injection molding with an injection molding machine (model name: Injection Molding Machine (manufactured by Explore)) under the conditions of a cylinder temperature of from 170° C. to 300° C. and a die temperature of from 30 to 120° C. to provide a dumbbell piece. The resultant dumbbell piece was subjected to compression molding at from 150 to 300° C. again to produce a plate having a thickness of 2 mm. The plate was defined as a measurement test piece.

In addition, polycarbonate resin composition molded articles of Comparative Examples 1 and 2 were produced by performing compounding through the use of a polycarbonate resin PC5 shown in Table 1, and the glass fibers obtained in Production Examples 7 and 8 as glass fillers according to compositions (mass %) shown in Table 3 and under the same conditions as those of Examples.

TABLE 3

| | | | Example 1 | Example 2 | Example 3 | Example 4 | Comparative Example 1 | Comparative Example 2 | Example 5 | Example 6 |
|---|---|---|---|---|---|---|---|---|---|---|
| PC resin composition | PC | Kind | PC1 | PC2 | PC3 | PC4 | PC5 | PC5 | PC6 | PC7 |
| | | Content [mass %] | 90 | 90 | 90 | 90 | 90 | 90 | 90 | 90 |
| | Glass filler | Kind | GF1 | GF1 | GF2 | GF3 | GF3 | GF4 | GF5 | GF6 |
| | | Content [mass %] | 10 | 10 | 10 | 10 | 10 | 10 | 10 | 10 |
| Refractive index difference between glass filler and PC | | nF (486.1 nm) | 0.000 | 0.001 | 0.001 | 0.003 | 0.038 | 0.007 | 0.001 | 0.001 |
| | | nD (589.3 nm) | 0.000 | 0.000 | 0.001 | 0.000 | 0.030 | 0.000 | 0.000 | 0.001 |
| | | nC (656.3 nm) | 0.001 | 0.001 | 0.001 | 0.001 | 0.028 | 0.002 | 0.002 | 0.001 |
| Evaluation | Optical characteristic | Total light transmittance [%] | 87.2 | 84.17 | 85.8 | 88.52 | 83.1 | 88 | 85.6 | 86.2 |
| | | Haze value [%] | 6.9 | 6.59 | 8 | 8.76 | 89.3 | 11.5 | 8.8 | 9.5 |

The results of Table 3 show that the molded articles of Examples 1 to 6 are each excellent in transparency because their total light transmittances are comparable to those of the molded articles of Comparative Examples 1 and 2, and their haze values are lower than those of the molded articles of Comparative Examples 1 and 2.

INDUSTRIAL APPLICABILITY

The polycarbonate resin composition and molded article of the present invention can be suitably used as, for example, alternative materials to glasses including the windows of automobiles, buildings, and the like, the alternative materials being each required to have mechanical strength, transparency, and rigidity, and further, scratch resistance and weatherability.

The invention claimed is:

1. A polycarbonate resin composition, comprising:
    a polycarbonate resin containing an aliphatic carbonate repeating unit (A) derived from an aliphatic dihydroxy compound; and
    a glass filler;
    wherein:
    the polycarbonate resin has a refractive index at a wavelength of 589.3 nm of 1.490 to 1.550;
    the glass filler has a refractive index at a wavelength of 589.3 nm of 1.500 to 1.540;
    the glass filler contains 50 to 75 mass % of silicon dioxide ($SiO_2$), 0 to 30 mass % of aluminum oxide ($Al_2O_3$), 0 to 20 mass % of boron oxide ($B_2O_3$), 0 to 11 mass % of magnesium oxide (MgO), 0 to 25 mass % of calcium oxide (CaO), 0 to 10 mass % of zinc oxide (ZnO), 0 to 10 mass % of strontium oxide (SrO), 0 to 10 mass % of barium oxide (BaO), 0 to 15 mass % of sodium oxide ($Na_2O$), 0 to 10 mass % of potassium oxide ($K_2O$), 0 to 10 mass % of lithium oxide ($Li_2O$), 0 to 10 mass % of titanium oxide ($TiO_2$), 0 to 1 mass % of iron oxide ($Fe_2O_3$), and 0 to 2 mass % of fluorine ($F_2$);
    a total content of silicon dioxide ($SiO_2$) and aluminum oxide ($Al_2O_3$) in the glass filler is 50 to 93 mass %;
    a total content of calcium oxide (CaO), zinc oxide (ZnO), strontium oxide (SrO), and barium oxide (BaO) in the glass filler is 0 to 25 mass %;
    a total content of sodium oxide ($Na_2O$), potassium oxide ($K_2O$), and lithium oxide ($Li_2O$) in the glass filler is 0 to 15 mass %;
    a difference between a refractive index of the polycarbonate resin and a refractive index of the glass filler is 0.004 or less for light having a wavelength of 486.1 nm, is 0.002 or less for light having a wavelength of 589.3 nm, and is 0.002 or less for light having a wavelength of 656.3 nm;
    the glass filler is present in an amount of 5 to 35 mass % with respect to a total amount of the polycarbonate resin and the glass filler; and
    the polycarbonate resin composition has a haze value of 9.5% or less, the haze value being measured using a molded article formed from the polycarbonate resin composition having a thickness of 2 mm.

2. The polycarbonate resin composition according to claim 1, wherein the polycarbonate resin contains the aliphatic carbonate repeating unit (A) derived from the aliphatic dihydroxy compound and an aromatic carbonate repeating unit (B) derived from an aromatic dihydroxy compound.

3. The polycarbonate resin composition according to claim 1, wherein the aliphatic carbonate repeating unit (A) is represented by the following formula (I):

[Chem. 1]

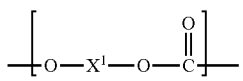

(I)

where $X^1$ represents a divalent aliphatic hydrocarbon group having 2 to 20 carbon atoms or a divalent alicyclic hydrocarbon group having 4 to 22 carbon atoms, and the divalent aliphatic hydrocarbon group and the divalent alicyclic hydrocarbon group may each contain at least one heteroatom selected from an oxygen atom, a nitrogen atom, and a sulfur atom, and at least one halogen atom selected from a fluorine atom, a chlorine atom, a bromine atom, and an iodine atom.

4. The polycarbonate resin composition according to claim 2, wherein the aromatic carbonate repeating unit (B) is represented by the following formula (II):

[Chem. 2]

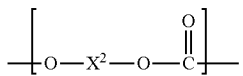

(II)

where $X^2$ represents a hydrocarbon residue containing an aromatic group.

5. The polycarbonate resin composition according to claim 2, wherein the polycarbonate resin has a molar ratio (A/B) of the aliphatic carbonate repeating unit (A) to the aromatic carbonate repeating unit (B) of 95/5 to 0.5/99.5.

6. The polycarbonate resin composition according to claim 1, wherein:
the polycarbonate resin has an Abbe number of 35 or more; and
a difference (nF-nC) between a refractive index (nF) of the polycarbonate resin for light having a wavelength of 486.1 nm and a refractive index (nC) thereof for light having a wavelength of 656.3 nm is 0.015 or less.

7. The polycarbonate resin composition according to claim 1, wherein the polycarbonate resin has a glass transition temperature of 75 to 175° C.

8. The polycarbonate resin composition according to claim 1, wherein the total content of sodium oxide ($Na_2O$), potassium oxide ($K_2O$), and lithium oxide ($Li_2O$) in the glass filler is 0 to 10 mass %.

9. The polycarbonate resin composition according to claim 1, wherein the glass filler has an Abbe number of 35 or more.

10. The polycarbonate resin composition according to claim 1, wherein when the polycarbonate resin composition is molded into a flat plate shape, the flat plate has a total light transmittance of 75% or more.

11. A molded article, which is obtained by molding the polycarbonate resin composition of claim 1.

12. The polycarbonate resin composition according to claim 1, wherein the glass filler is present in an amount of 10 to 35 mass % with respect to the total amount of the polycarbonate resin and the glass filler.

13. The polycarbonate resin composition according to claim 1, wherein the glass filler is present in an amount of 10 to 30 mass % with respect to the total amount of the polycarbonate resin and the glass filler.

14. The polycarbonate resin composition according to claim 1, comprising:
the polycarbonate resin in an amount of 70 to 95 mass % with respect to the total amount of the polycarbonate resin and the glass filler; and
the glass filler in an amount of 5 to 30 mass % with respect to the total amount of the polycarbonate resin and the glass filler;
wherein:
the polycarbonate resin comprises at least one repeating unit (A) derived from at least one member selected from the group consisting of cyclohexanedimethanol, tricyclodecanedimethanol, and isosorbide, and at least one repeating unit (B) derived from bisphenol A; and
a molar ratio (A/B) of the repeating unit (A) to the repeating unit (B) is 100/0 to 40/60.

* * * * *